(12) United States Patent
Nakano et al.

(10) Patent No.: US 7,839,555 B2
(45) Date of Patent: Nov. 23, 2010

(54) DISPLAY DEVICE AND ELECTRIC APPARATUS USING THE SAME

(75) Inventors: Shinichi Nakano, Osaka (JP); Akio Miyata, Nara (JP); Tomoko Teranishi, Osaka (JP); Hiroko Niwano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 996 days.

(21) Appl. No.: 11/585,968

(22) Filed: Oct. 25, 2006

(65) Prior Publication Data
US 2007/0040982 A1    Feb. 22, 2007

(51) Int. Cl.
*G02F 1/153* (2006.01)
(52) U.S. Cl. .............. 359/272; 359/270; 359/273
(58) Field of Classification Search .............. 359/265, 359/270, 272, 273, 665
See application file for complete search history.

(56) References Cited

U.S. PATENT DOCUMENTS 5,731,792 A    3/1998  Sheridon 6,603,444 B1    8/2003  Kawanami et al.
6,961,168 B2 *  11/2005  Agrawal et al. ............. 359/273
2006/0132927 A1 *  6/2006  Yoon ........................... 359/665

FOREIGN PATENT DOCUMENTS

JP    10-39799    2/1998
JP    2000-356750    12/2000

* cited by examiner

*Primary Examiner*—William C Choi
(74) *Attorney, Agent, or Firm*—Nixon & Vanderhye P.C.

(57) ABSTRACT

In a display device that includes a display space provided on a display surface side and a liquid sealed inside the display space so as to be operable and is constituted so as to be able to change a display color on the display surface side according to an application of an electric field to the liquid, the liquid is an ionic liquid containing an ambient temperature molten salt combining a cation and an anion. Further, an amount of water blended in the liquid is 0 to 10 parts by weight with respect to 100 parts by weight of the ionic liquid. This makes it possible both to reduce a voltage to be applied to the liquid so as to allow driving at a low voltage and to improve an operation performance.

15 Claims, 10 Drawing Sheets

DISPLAY DEVICE AND ELECTRIC APPARATUS USING THE SAME

BACKGROUND OF THE INVENTION

1. Field of the Invention

The present invention relates to a display device that utilizes an external electric field to move a liquid, thereby displaying information, in particular, a display device utilizing an electrowetting phenomenon, and an electric apparatus using the same.

2. Description of Related Art

Conventionally, display devices that display information by utilizing a moving phenomenon of a transparent or colored liquid have been suggested. For example, display devices that utilize an external electric field to move a liquid, thereby displaying information, include those of an electroosmosis system and of an electrowetting system.

In the display devices of the electroosmosis system, a liquid impregnation rate of a surface of a porous body is controlled so as to scatter external light, whereby a light reflectance and a light transmittance thereof with respect to the external light are controlled. Also, these display devices of the electroosmosis system have a configuration in which the porous body and the transparent liquid that have an equal refractive index are prepared in advance so as to achieve transparency by filling the liquid in through holes (small holes) in the porous body and cause light to be scattered by allowing the liquid to flow out from the through holes.

In the display devices of the electrowetting system, an electric field is applied to a liquid inside small pores so as to vary an interfacial tension of the liquid, thus causing this liquid to move by an electrocapillary phenomenon (an electrowetting phenomenon). More specifically, when a switch between a pair of electrodes provided on an inner surface of a small hole is closed so as to apply an electric field to the liquid, a wettability of the liquid with respect to the inner surface of the small hole varies. Accordingly, a contact angle of the liquid with respect to the inner surface of the small hole decreases, so that the liquid moves inside the small hole. On the other hand, when the switch is opened to stop the application of electric field to the liquid, the wettability of the liquid with respect to the inner surface of the small hole varies, thus increasing the contact angle sharply, so that the liquid flows out from the small hole.

In order to display moving images in the display devices described above, the liquid has to be moved inside the small hole at a high speed and at a low voltage. When the electroosmosis system and the electrowetting system are compared in this respect, the electrowetting system is more suitable for displaying moving images because it can move the liquid at a higher speed.

Further, using the conventional display devices, image displays utilizing the electrowetting phenomenon are provided as described in JP 10(1998)-39799 A, for example.

More specifically, as shown in FIG. 10, a display device according to the above-noted first conventional example is constituted by transparent sheets, and includes a first sheet 1, a second sheet 2 and a third sheet 3 that are arranged in this order from an upper side of FIG. 10 (a display surface side) with predetermined gaps therebetween. An upper side passage 4 is provided between the first sheet 1 and the second sheet 2, and a lower side passage 5 is provided between the second sheet 2 and the third sheet 3. Also, the second sheet 2 is provided with reservoirs 6 and 7 that allow the upper side passage 4 and the lower side passage 5 to communicate with each other. Furthermore, inside the upper side passage 4, the lower side passage 5, the reservoirs 6 and 7, a liquid L1 that is colored in a predetermined color and has a conductivity and a transparent liquid L2 that is transparent are sealed.

Moreover, in this display device according to this first conventional example, first electrodes 8A and 8B respectively are disposed on a lower surface side of the first sheet 1 and an upper surface side of the second sheet 2 so as to sandwich the upper side passage 4. Also, inside the upper side passage 4, a second electrode 9 is disposed at a position opposed to an upper end opening of the reservoir 6. The first electrodes 8A, 8B and the second electrode 9 are connected with a direct current power supply as shown in FIG. 10, thereby making it possible to apply an electric field to the liquid L1.

In the display device according to the first conventional example having the above-described configuration, a circuit between the first electrodes 8A, 8B and the second electrode 9 is closed to apply a voltage between these electrodes, thereby both moving the transparent liquid L2 inside the upper side passage 4 to a side of the lower side passage 5 and moving the liquid L1 from a side of the reservoir 6 to a side of the upper side passage 4 so as to cause the above-mentioned predetermined color to be present on the display surface side.

On the other hand, the above-described circuit is opened, thereby both returning the liquid L1 from the side of the upper side passage 4 to the side of the reservoir 6 and moving the transparent liquid L2 from the side of the reservoir 7 to the side of the upper side passage 4, so that the transparent display is achieved on the display surface side.

In addition, in this display device according to the first conventional example, water, alcohol, acetone, formamide, ethylene glycol or a mixture thereof is used as the colored conductive liquid L1.

Also, in the display device according to a second conventional example as described in JP 2000-356750 A, for example, an aqueous solution in which an electrolyte such as NaCl or $Na_2SO_4$ is dissolved, a polar liquid such as water, alcohol, acetone, formaldehyde or ethylene glycol, or a mixture thereof with other suitable liquids are mentioned as the above-described conductive liquid.

However, in the conventional display devices described above, the conductive liquid has not been studied sufficiently. Thus, the conventional display devices have had a problem in that it is difficult to reduce a voltage applied to move the liquid, namely, a drive voltage of the display devices. Further, in the conventional display devices, part of the liquid sometimes vaporizes or solidifies depending on their ambient temperature. Consequently, in the conventional display devices, an adverse effect of the ambient temperature sometimes reduces a moving amount of the liquid or inhibits the movement of the liquid, so that a normal operation of changing display colors cannot be carried out, resulting in a malfunction.

SUMMARY OF THE INVENTION

With the foregoing problems in mind, it is an object of the present invention to reduce a voltage to be applied to a liquid, thereby providing a display device with an excellent operation performance that can be driven at a low voltage and an electric apparatus using the same.

In order to achieve the above-mentioned object, a display device according to the present invention includes a display space provided on a display surface side, and a liquid sealed inside the display space so as to be operable. The display device is constituted so as to be able to change a display color on the display surface side according to an application of an electric field to the liquid. The liquid is an ionic liquid containing an ambient temperature molten salt combining a cation and an anion, and an amount of water blended in the liquid is 0 to 10 parts by weight with respect to 100 parts by weight of the ionic liquid.

For the liquid in the display device having the configuration described above, the above-noted ionic liquid containing the ambient temperature molten salt is used, and the amount of water blended in 100 parts by weight of the ionic liquid is restricted to equal to or lower than 10 parts by weight. This makes it possible both to reduce the voltage applied to the liquid unlike the above-described conventional examples and to prevent the malfunction due to an adverse effect of an ambient temperature in a reliable manner. Thus, a display device with an excellent operation performance that can be driven at a low voltage can be achieved.

Further, in the above-described display device, it is preferable that the liquid is colored in a predetermined color, a transparent upper layer provided on the display surface side and a light-scattering layer provided such that the display space is formed between the upper layer and the light-scattering layer are provided, and the display color on the display surface side is changed selectively between the predetermined color resulting from the liquid and white resulting from the light-scattering layer.

In this case, with a simple structure, it is possible to constitute a display device in which the display color on the display surface side can be changed between the predetermined color and white. Also, since white resulting from the light-scattering layer is displayed, the quality of the white display can be improved easily.

Also, the above-described display device may include a lower layer provided on a non-display surface side of the light-scattering layer. An upper space constituting the display space may be formed between the upper layer and the light-scattering layer, and a lower space that is in communication with the upper space via a communication space provided so as to penetrate through the light-scattering layer may be provided between the light-scattering layer and the lower layer. The display device may include a transparent upper electrode provided on a surface side opposed to the upper space in at least one of the upper layer and the light-scattering layer, a common electrode provided in the light-scattering layer so as to surround the communication space, a lower electrode provided on a surface side opposed to the lower space in at least one of the light-scattering layer and the lower layer, and a driving portion that includes an upper switch connected between the upper electrode and the common electrode, a lower switch connected between the lower electrode and the common electrode and a power supply and changes the display color on the display surface side by moving the liquid toward the upper space or the lower space according to an operation of opening/closing the upper switch and the lower switch.

In this case, since the display color on the display surface side is changed to the predetermined color or white according to the operation of opening/closing the upper switch and the lower switch, it is possible to improve the moving speed of the liquid toward the upper space (the display space) easily.

Moreover, in the above-described display device, it is preferable that a dielectric layer is layered on surfaces of the upper electrode and the lower electrode.

In this case, the electric field to be applied by the dielectric layer to the liquid is increased reliably, thereby improving the moving speed of this liquid more easily.

Also, in the above-described display device, the light-scattering layer may be provided with a liquid storage space whose one end is in communication with the display space.

The display device may include a transparent first electrode provided on a surface side opposed to the display space in at least one of the upper layer and the light-scattering layer, a second electrode provided in the light-scattering layer so as to surround the liquid storage space, and a driving portion that has a switch and a power supply connected between the first electrode and the second electrode and changes the display color on the display surface side by moving the liquid toward the display space or the liquid storage space according to an operation of closing/opening the switch.

In this case, a compact display device can be constituted with a simple structure more easily.

Furthermore, in the above-described display device, it is preferable that a dielectric layer is layered on a surface of the first electrode or the second electrode.

In this case, the electric field to be applied by the dielectric layer to the liquid is increased reliably, thereby improving the moving speed of this liquid more easily.

Also, in the above-described display device, it is preferable that the liquid is an ionic liquid that is a nonaqueous solution containing no water.

In this case, it is possible to prevent the malfunction due to an adverse effect of an ambient temperature in a more reliable manner while reducing the voltage applied to the liquid.

Further, in the above-described display device, an electrolyte of the ionic liquid may be a 1-1 salt obtained by combining one kind of the cation that is monovalent and one kind of the anion that is monovalent In other words, since an electrostatic interaction between cation and anion is proportional to the product of electric charges in an ionic liquid, one kind of monovalent cation and one kind of monovalent anion are selected so as to reduce the interaction between ions, thereby making it possible to lower a melting point and a viscosity. Consequently, it becomes possible to improve low-temperature characteristics as a low temperature molten salt.

Moreover, in the above-described display device, the cation may be selected from the group consisting of 1,3-dialkylimidazolium cation, N-alkylpyridinium cation, tetraalkylammonium cation and tetraalkylphosphonium cation.

More specifically, 1,3-dialkylimidazolium cation, N-alkylpyridinium cation, tetraalkylammonium cation and tetraalkylphosphonium cation mentioned above are chemical compounds respectively represented by the chemical formulae (1), (2), (3) and (4) below.

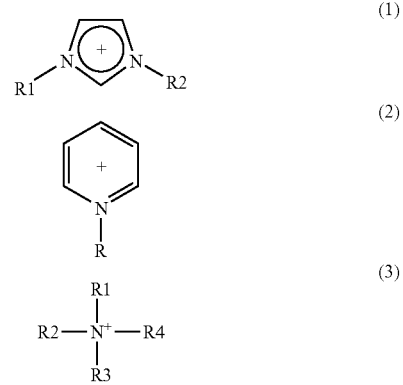

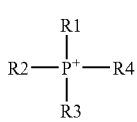

(4)

Incidentally, R1 and R2 in the chemical formula (1), R in the chemical formula (2), R1, R2, R3 and R4 in the chemical formula (3) and R1, R2, R3 and R4 in the chemical formula (4) are each, independently of one another, an alkyl group. This alkyl group can have, for example, 1 to 10 carbon atoms and preferably 1 to 6 carbon atoms. The alkyl group having 1 to 10 carbon atoms can be, for example, methyl, ethyl, n-propyl, i-propyl, n-butyl, 2-methylpropyl, 3-methylpropyl, n-pentyl, 2-methylbutyl, n-hexyl, 2-methylpentyl, n-heptyl, 2-methylhexyl, n-octyl, 2-methylheptyl, n-nonyl, 2-methyloctyl, n-decyl, 2-methylnonyl or the like. Further, the alkyl group having 1 to 6 carbon atoms can be, for example, methyl, ethyl, n-propyl, i-propyl, n-butyl, 2-methylpropyl, 3-methylpropyl, n-pentyl, 2-methylbutyl, n-hexyl, 2-methylpentyl or the like.

Also, in the above-described display device, the anion may be selected from the group consisting of $(AlCl_3)nCl^-$, $(AlBr_3)nBr^-$, $Cl^-$, $Br^-$, $I^-$, $(HF)nF^-$, $(HF)_2F_3^-$, $BF_4^-$, $AlF_4^-$, $PF_6^-$, $AsF_6^-$, $SbF_6^-$, $NbF_6^-$, $TaF_6^-$, $CH_3SO_3^-$, $WF_7^-$, $NO_3^-$, $NO_2^-$, $VOCl_4^-$, $CF_3SO_3^-$, $(CF_3SO_2)_2N^-$, $(CF_3SO_2)_3C^-$, $C_4H_9SO_3^-$, $(CF_3CF_2SO_2)N^-$, $CF_3CO_2^-$, $CF_3CF_2CF_2CO^-$, $CF_3CF_2CF_2SO_3^-$, $(CN)_2N^-$ and $CH_3CO_2^-$, where n is an integer.

Additionally, in the above-described display device, it is preferable that the ionic liquid contains a chemical species selected from the group consisting of chemical compounds represented by the structural formulae below.

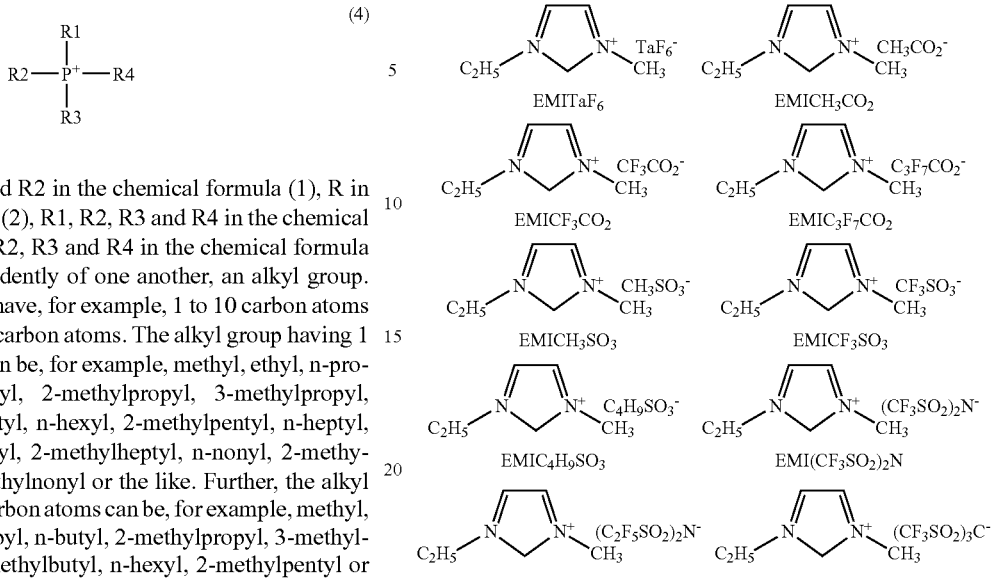

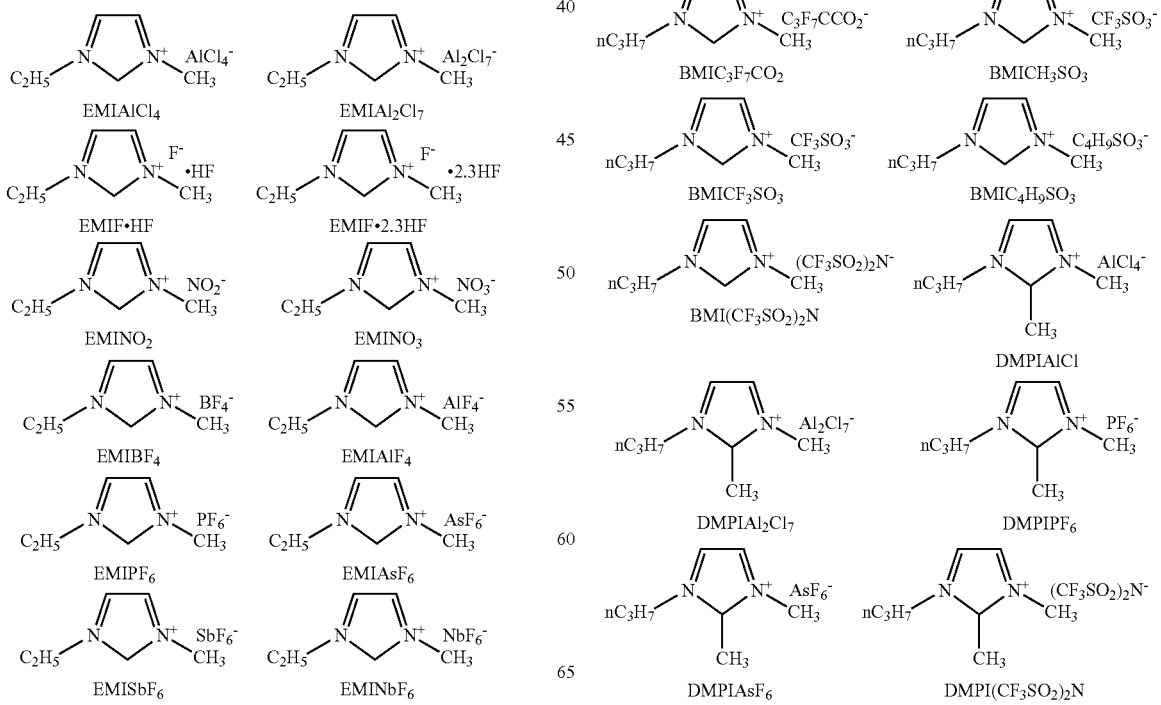

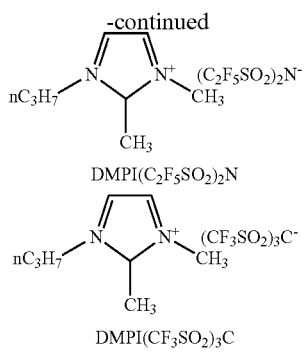

DMPI(C₂F₅SO₂)₂N

DMPI(CF₃SO₂)₃C

In other words, since the EMI, BMI and DMPI noted above are stable toward the air and water and have a high ionic conductivity, they can move the ionic liquid at a high speed at a low voltage. Thus, they are used in a preferred manner. In particular, among chemical compounds having the same anion, those having EMI+ show a maximum electric conductivity at room temperature, thus making it possible to improve the driving characteristics of the liquid easily.

Also, in the above-described display device, it is preferable that the ionic liquid has an ionic conductivity (s/cm) at 25° C. of equal to or greater than $0.1 \times 10^{-3}$.

In this case, this liquid can be moved more easily, thus allowing the liquid to move at a low voltage. Thus, it is possible to improve driving characteristics of this liquid.

Further, in the above-described display device, it is preferable that the ionic liquid has a viscosity at 25° C. of equal to or smaller than 300 cp.

In this case, it is possible to drive the liquid at a low voltage of equal to or lower than about 50 V.

Moreover, in the above-described display device, it is preferable that the ionic liquid has a melting point ranging from −4° C. to −90° C.

In this case, an ionic liquid that solidifies at room temperature (about 25° C.) can be excluded, making it possible to prepare a more suitable liquid reliably. More specifically, an ionic liquid having a high ionic conductivity even at a low temperature region, for example, $EMIBF_4$ or the like is used in a preferred manner.

Furthermore, in the above-described display device, it is preferable that an insulating fluid that does not mix with the liquid is sealed inside the display space.

In this case, it is possible to raise the moving speed of the above-noted liquid easily. Also, as the insulating fluid, it is preferable to use a fluid that is transparent or colored in a color different from the above-mentioned predetermined color, for example, a nonpolar oil containing one or plural kinds selected from the group consisting of side-chain higher alcohol, side-chain higher fatty acid, alkane, a silicone oil and a matching oil. In other words, when using a nonpolar oil that is not compatible with the above-noted liquid, it becomes possible to move the liquid at a higher speed compared with the case of using other insulating fluid such as the air. This makes it easier to raise the speed of changing the display color on the display surface side.

Additionally, in the above-described display device, it is preferable that a plurality of the display spaces are provided respectively for a plurality of colors allowing a full color display on the display surface side.

In this case, by moving the corresponding conductive liquids in the plurality of the display spaces in a suitable manner, it is possible to display a color image.

Moreover, an electric apparatus according to the present invention includes a display portion for displaying information containing a character and an image. The display portion is a display device that includes a display space provided on a display surface side and a liquid sealed inside the display space so as to be operable and is constituted so as to be able to change a display color on the display surface side according to an application of an electric field to the liquid. The liquid is an ionic liquid containing an ambient temperature molten salt combining a cation and an anion, and an amount of water blended in the liquid is 0 to 10 parts by weight with respect to 100 parts by weight of the ionic liquid.

In the electric apparatus having the above-described configuration, since the display device with an excellent operation performance that can be driven at a low voltage is used for the display portion, an electric apparatus including the display portion that achieves a low power consumption and has an excellent display performance can be constituted easily.

DETAILED DESCRIPTION OF THE INVENTION,

The following is a description of preferred embodiments of a display device and an electric apparatus according to the present invention, with reference to the accompanying drawings. In the description below, a case of applying the present invention to an image display including a display portion capable of displaying a color image will be illustrated.

Embodiment 1

Figure 1:
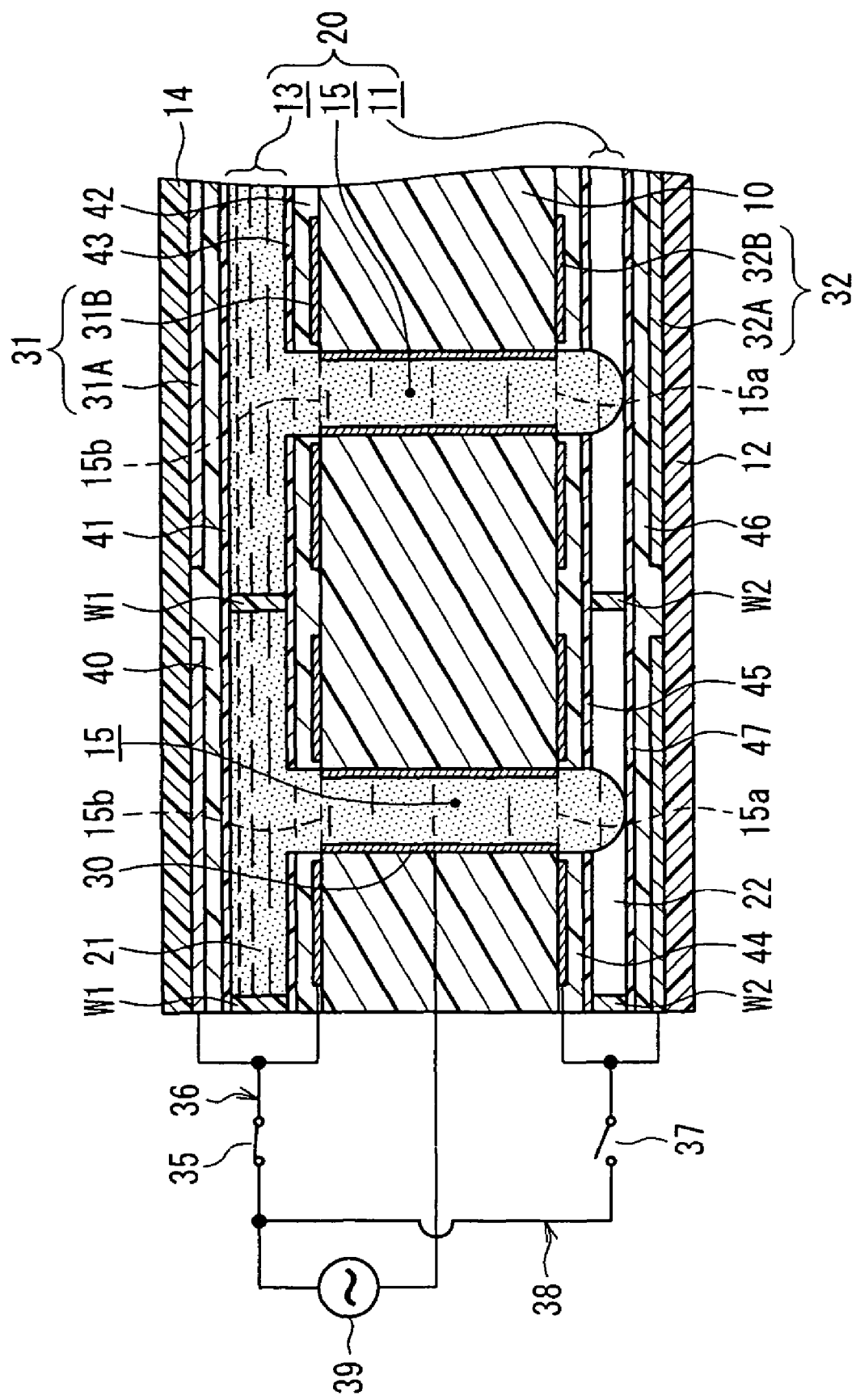
FIG. 1 is a sectional view showing a configuration of a main portion of a display device and an image display according to Embodiment 1 of the present invention in a state of displaying a color resulting from a liquid.
Figure 2:
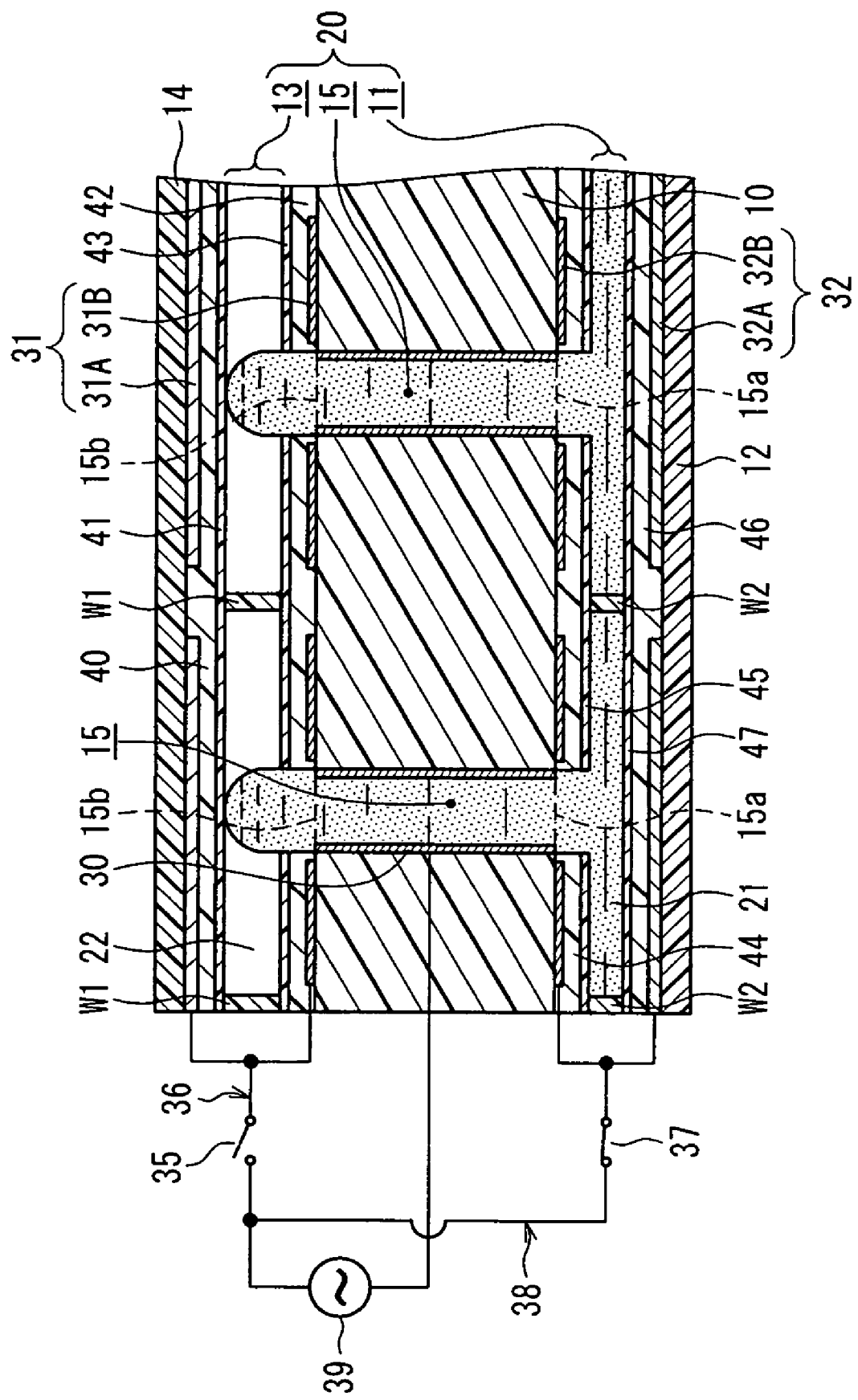
FIG. 2 is a sectional view showing the configuration of the main portion of the display device and the image display described above in a state of displaying white.

FIG. 1 is a sectional view showing a configuration of a main portion of a display device and an image display according to Embodiment 1 of the present invention in a state of displaying a color resulting from a liquid. FIG. 2 is a sectional view showing the configuration of the main portion of the display device and the image display described above in a state of displaying white.

In FIGS. 1 and 2, the image display according to the present embodiment is provided with a display portion constituted by the display device according to the present invention. In this display portion, an upper side in the figure corresponds to a display surface side recognized visually by a user. The above-noted display device includes a light-scattering sheet 10 for scattering external light from the display surface side so as to display white, a lower electrode substrate 12 provided on a non-display surface side of the light-scattering sheet 10 such that a rectangular lower space 11 is formed between the light-scattering sheet 10 and the lower electrode substrate 12, and an upper electrode substrate 14 provided on the display surface side of the light-scattering sheet 10 such that a rectangular upper space 13 is formed between the light-scattering sheet 10 and the upper electrode substrate 14. The light-scattering sheet 10 and the lower electrode substrate 12 are formed of an insulating material and respectively constitute a light-scattering layer and a lower layer. Also, the upper electrode substrate 14 is formed of a transparent insulating material and constitutes a transparent upper layer provided on the display surface side. Further, in the display device, the upper space 13 and the lower space 11 respectively are partitioned off by a plurality of partition walls W1 and W2, so that a plurality of pixel regions are formed in a transverse direction of the figure and a direction perpendicular to the paper surface of the figure. Moreover, in the display device, the pixel regions for individual colors of R, G and B are provided so as to be adjacent to one another as a single picture element, for example, thus allowing a full-color display on the above-noted display surface side.

In a central portion of each of the pixel regions of the light-scattering sheet 10, a through hole 15 penetrating through the light-scattering sheet 10 in its thickness direction (the vertical direction in the figures) is provided. This through hole 15 constitutes a communication space, and one end thereof is in communication with the upper space 13 constituting a display space. Also, the other end of the through hole 15 is in communication with the lower space 11, and the upper space 13 and the lower space 11 are in communication with each other via the through hole 15. In other words, a lower end opening 15a of the through hole 15 is provided so as to be opposed to the lower electrode substrate 12, and an upper end opening 15b thereof is provided so as to be opposed to the upper electrode substrate 14, so that the through hole 15, the lower space 11 and the upper space 13 form a liquid storage portion 20 having an I-shaped cross-section in each of the pixels.

In the liquid storage portion 20, a conductive liquid 21 as the liquid colored in a predetermined color of R, G or B and a nonpolar oil 22 are sealed.

The nonpolar oil 22 has a physical property of not mixing with the conductive liquid 21. As the nonpolar oil 22, an oil that is transparent or colored in a color different from the conductive liquid 21 and contains one or plural kinds selected from the group consisting of side-chain higher alcohol, side-chain higher fatty acid, alkane, a silicone oil and a matching oil is used. In this way, by using the nonpolar oil 22 that is not compatible with the conductive liquid 21, a liquid drop of the conductive liquid 21 moves in the nonpolar oil 22 more easily, making it possible to move the conductive liquid 21 at a high speed.

Further, in the two adjacent liquid storage portions 20 partitioned off by the partition walls W1 and W2, the conductive liquids 21 that are colored in different colors are sealed. In other words, a coloring agent such as a pigment or a dye of R, G or B is added to the conductive liquid 21, so that a display color on the display surface side can be a color corresponding to R, G or B.

As the conductive liquid 21, an ionic liquid containing an ambient temperature molten salt obtained by combining cation and anion is used. Moreover, in this conductive liquid 21, the amount of water blended in 100 parts by weight of the ionic liquid is set to range from 0 to 10 parts by weight. In the present embodiment, an ionic liquid whose amount of blended water is 0 part by weight, namely, an ionic liquid that is a nonaqueous solution is used as the conductive liquid 21.

In this manner, the ionic liquid containing the above-described ambient temperature molten salt, namely, the ionic liquid having a melting point equal to or lower than a room temperature (about 25° C.) is used as the conductive liquid 21. Accordingly, the conductive liquid 21 that is nonvolatile, has a vapor pressure of 0 and has an excellent thermal stability is prepared. Furthermore, the conductive liquid 21 is prepared so that its liquid temperature region is wide, in other words, a temperature range in which the conductive liquid 21 is in a liquid phase is wide. Thus, the conductive liquid 21 does not vaporize or solidify due to an ambient temperature within a working (allowable) temperature range of the display device.

Moreover, in the conductive liquid 21, an ambient temperature molten salt formed of a 1-1 salt obtained by combining one kind of monovalent cation and one kind of monovalent anion is used in its ionic liquid. This improves low-temperature characteristics of the conductive liquid 21. In other words, since an electrostatic interaction between cation and anion is proportional to the product of electric charges in an ionic liquid, one kind of monovalent cation and one kind of monovalent anion are selected so as to reduce the interaction between ions, thereby making it possible to lower a melting point and a viscosity. Consequently, it becomes possible to improve low-temperature characteristics as a low temperature molten salt.

Particularly, the cation may be selected from the group consisting of 1,3-dialkylimidazolium cation, N-alkylpyridinium cation, tetraalkylammonium cation and tetraalkylphosphonium cation.

More specifically, 1,3-dialkylimidazolium cation, N-alkylpyridinium cation, tetraalkylammonium cation and tetraalkylphosphonium cation mentioned above are chemical compounds respectively represented by the chemical formulae (1), (2), (3) and (4) below.

(1)

(2)

(3)

(4)

Incidentally, R1 and R2 in the chemical formula (1), R in the chemical formula (2), R1, R2, R3 and R4 in the chemical formula (3) and R1, R2, R3 and R4 in the chemical formula (4) are each, independently of one another, an alkyl group. This alkyl group can have, for example, 1 to 10 carbon atoms and preferably 1 to 6 carbon atoms. The alkyl group having 1 to 10 carbon atoms can be, for example, methyl, ethyl, n-propyl, i-propyl, n-butyl, 2-methylpropyl, 3-methylpropyl, n-pentyl, 2-methylbutyl, n-hexyl, 2-methylpentyl, n-heptyl, 2-methylhexyl, n-octyl, 2-methylheptyl, n-nonyl, 2-methyloctyl, n-decyl, 2-methylnonyl or the like. Further, the alkyl group having 1 to 6 carbon atoms can be, for example, methyl, ethyl, n-propyl, i-propyl, n-butyl, 2-methylpropyl, 3-methylpropyl, n-pentyl, 2-methylbutyl, n-hexyl, 2-methylpentyl or the like.

Furthermore, in the display device described above, the anion may be selected from the group consisting of $(AlCl_3)nCl^-$, $(AlBr_3)nBr^-$, $Cl^-$, $Br^-$, $I^-$, $(HF)nF^-$, $(HF)_2F_3^-$, $BF_4^-$, $AlF_4^-$, $PF_6^-$, $AsF_6^-$, $SbF_6^-$, $NbF_6^-$, $TaF_6^-$, $CH_3SO_3^-$, $WF_7^-$, $NO_3^-$, $NO_2^-$, $VOCl_4^-$, $CF_3SO_3^-$, $(CF_3SO_2)_2N^-$, $(CF_3SO_2)_3C^-$, $C_4H_9SO_3^-$, $(CF_3CF_2SO_2)N^-$, $CF_3CO_2^-$, $CF_3CF_2CF_2CO^-$, $CF_3CF_2CF_2SO_3^-$, $(CN)_2N^-$ and $CH_3CO_2^-$, where n is an integer.

Also, in the display device described above, it is preferable that the ionic liquid contains a chemical species selected from the group consisting of chemical compounds represented by the structural formulae below.

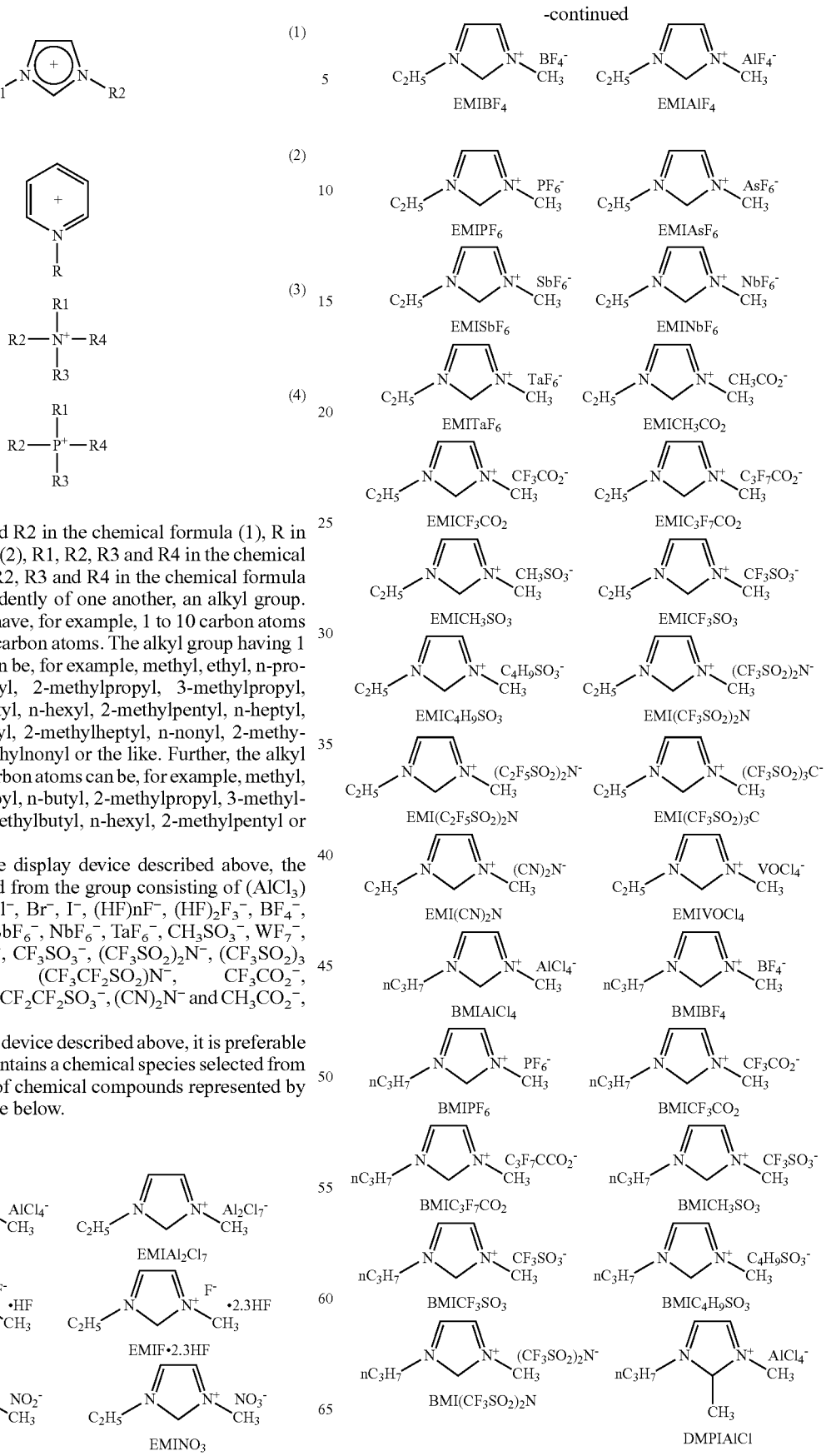

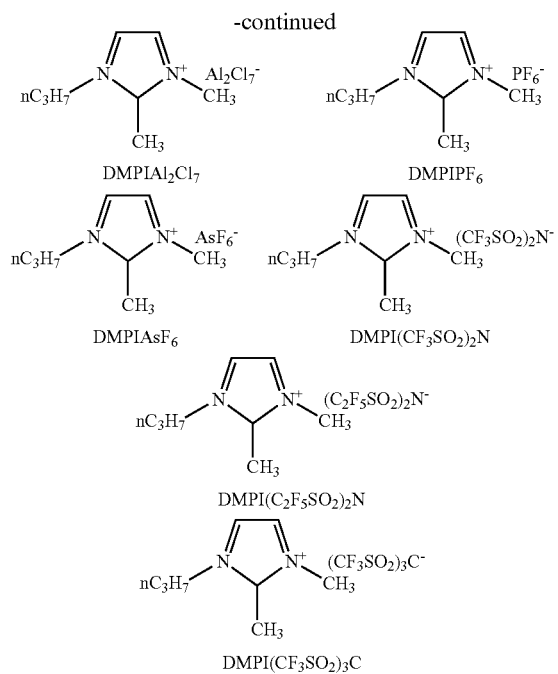

Also, since the above-noted anion have very different fundamental physical properties depending on their kinds, it is preferable to combine the anion and the cation so as to achieve an ionic liquid having physical properties described below:

the ionic liquid has a melting point of −4° C. to −90° C., is liquid at room temperature, is nonvolatile and thus has a vapor pressure of 0, has a wide liquid temperature region and an excellent thermal stability;

has an ionic conductivity (s/cm) of equal to or greater than $0.1 \times 10^{-3}$ at room temperature (25° C.); and has a viscosity of equal to or smaller than 300 cp at room temperature (25° C.).

The ionic liquid having the above-mentioned physical properties can contain chemical species of 1-ethyl-3-methylimidazolium (EMI), 1-butyl-3-methylimidazolium (BMI) or 1,2-dimethyl-3-propylimidazolium (DMPI) noted above.

Although a higher ionic conductivity is more preferable, an upper limit of the ionic conductivity of a currently available ionic liquid is about $3.5 \times 10^{-3}$. This ionic conductivity evaluation is determined by a complex impedance method using an SUS electrode with an impedance analyzer HP4294A manufactured by TOYO Corporation.

Further, the ionic conductivity (s/cm) is set to be equal to or greater than $0.1 \times 10^{-3}$ so that the electric charges can be stored more easily at an interface between a dielectric layer, which will be described later, and the ionic liquid (conductive liquid 21). Because of an increase in an electric charge density, the electric charges repel each other, making it easier to change a surface shape (a surface energy) of the conductive liquid 21. Consequently, the conductive liquid 21 can be driven at a low voltage.

Moreover, the ionic liquid is set to have a viscosity of equal to or smaller than 300 cp at 25° C., thereby making it possible to drive the conductive liquid 21 at a low voltage equal to or lower than about 50 V Incidentally, although a lower viscosity is more preferable, a lower limit of the currently available viscosity is about 60 cp.

Also, in the display device, for the purpose of applying a voltage to or removing a voltage from the conductive liquid 21 so as to move the conductive liquid 21 and replace it with the nonpolar oil 22, the display device has in each pixel a three-terminal structure including a common electrode 30 provided so as to surround the through hole 15, a transparent upper electrode 31 provided on a side of the upper space 13 and a lower electrode 32 provided on a side of the lower space 11.

More specifically, the common electrode 30 is provided along an inner surface of the light-scattering sheet 10 surrounding the through hole 15. This common electrode 30 is an electrode made of a metal such as aluminum or copper and formed by a vacuum evaporation method, a sputtering method, an ion plating method, a dip coating method or the like.

Also, on a lower surface of the upper electrode substrate 14, an upper-side upper electrode 31A is provided so as to cover the display surface side of the upper space 13. Further, on the side of the light-scattering sheet 10, a lower-side upper electrode 31B is provided on a surface opposed to the upper space 13 except for an opening of the through hole 15. These upper electrodes 31A and 31B are transparent electrodes using an ITO film or the like and connected electrically with each other. Incidentally, it is appropriate that the upper electrode 31 be provided on a surface side opposed to the upper space 13 in at least one of the upper electrode substrate 14 and the light-scattering sheet 10.

Moreover, on an upper surface of the lower electrode substrate 12, a lower-side lower electrode 32A is provided so as to cover the non-display surface side of the lower space 11. Further, on the side of the light-scattering sheet 10, an upper-side lower electrode 32B is provided on a surface opposed to the lower space 11 except for an opening of the through hole 15. These lower electrodes 32A and 32B are electrodes made of a metal such as aluminum or copper and formed by a vacuum evaporation method, a sputtering method, an ion plating method, a dip coating method or the like. Incidentally, it is appropriate that the lower electrode 32 be provided on a surface side opposed to the lower space 11 in at least one of the lower electrode substrate 12 and the light-scattering sheet 10.

Further, the upper electrode 31 and the common electrode 30 are connected to an alternating-current power supply 39 via an upper switch 35. The upper electrode 31, the common electrode 30, the upper switch 35 and the alternating-current power supply 39 mentioned above constitute an upper-side power supply circuit 36. On the other hand, the lower electrode 32 and the common electrode 30 are connected to the alternating-current power supply 39 via a lower switch 37. The lower electrode 32, the common electrode 30, the lower switch 37 and the alternating-current power supply 39 mentioned above constitute a lower-side power supply circuit 38. Then, in the display device, the application of the electric field to the conductive liquid 21 is started/stopped according to operations of closing/opening the upper switch 35 and the lower switch 37. Also, the upper-side power supply circuit 36 and the lower-side power supply circuit 38 constitute a driving portion for moving the conductive liquid 21 toward the upper space 13 or the lower space 11 according to the operations of closing/opening the upper switch 35 and the lower switch 37 so as to change a display color on the display surface side, and the conductive liquid 21 is moved by the electrowetting phenomenon.

The surfaces of the upper electrodes 31A and 31B are provided with dielectric layers 40 and 42, respectively. Also, the surfaces of the dielectric layers 40 and 42 are provided with insulating water-repellent films 41 and 43, respectively, which are in contact with the conductive liquid 21 or the nonpolar oil 22.

Likewise, the surfaces of the lower electrodes 32A and 32B are provided with dielectric layers 46 and 44, respectively. Also, the surfaces of the dielectric layers 46 and 44 are provided with insulating water-repellent films 47 and 45, respectively, which are in contact with the conductive liquid 21 or the nonpolar oil 22.

The dielectric layers 40, 42, 44 and 46 are formed of a high dielectric film containing parylene or aluminum oxide, for example, and have a thickness of about 1 to 0.1 μm. Also, the water-repellent films 41, 43, 45 and 47 preferably become layers having an affinity for the conductive liquid 21 at the time of applying a voltage. More specifically, a fluorocarbon resin is preferable.

Alternatively to the above description, the surface of the common electrode 30 also can be provided with a coating that becomes lipophilic in an ON (closed) state of the upper switch 35 or the lower switch 37 and becomes lipophobic in an OFF (opened) state of the upper switch 35 or the lower switch 37, thereby improving a moving speed of the nonpolar oil 22 at the time of the operation of closing/opening the upper switch 35 or the lower switch 37, so that the moving speed of the conductive liquid 21 can be raised as well. However, as shown in FIGS. 1 and 2, it is more preferable that the conductive liquid 21 constantly is in contact with the common electrode 30 regardless of the dosing/opening operation of the upper switch 35 and the lower switch 37 so as to apply the voltage to this conductive liquid 21 directly, because the moving speed of the conductive liquid 21 can be improved easily.

As the light-scattering sheet 10, a scattering reflector containing a transparent polymeric resin and plural kinds of fine particles that are added into the polymeric resin and have different refractive indices is used. Thus, when the conductive liquid 21 flows out of the upper space 13 and the transparent nonpolar oil 22 flows into the upper space 13, it is possible to display the display surface as white as paper. More specifically, in the light-scattering sheet 10, the above-noted polymeric resin can be a thermoplastic resin or a thermosetting resin, for example, an epoxy resin, an acrylic resin, a polyimide resin, a polyamide resin, polycarbonate, Teflon (registered trademark) or the like. Also, in the light-scattering sheet 10, fine particles of titanium oxide or alumina having a large refractive index and hollow polymer fine particles having a small refractive index are contained as the above-noted plural kinds of fine particles. They cause diffusion on the surface of the light-scattering sheet 10, making it possible to achieve a color as white as paper.

Alternatively to the above description, a light-scattering sheet using glass, ceramic or the like also can be used.

Further, the above-described through hole 15 has a diameter of about 0.1 μm to 100 μm, and can raise the intensity of the electric field generated in the through hole 15 in the ON state of the upper switch 35 or the lower switch 37. This makes it possible to increase the moving speed of the conductive liquid 21 moving from the inside of the through hole 15 toward the upper space 13 or the lower space 11 by the electrowetting phenomenon.

Moreover, the light-scattering sheet 10 has a thickness of preferably about 10 μm to 300 μm, more preferably 10 μm to 100 μm and particularly preferably about 50 μm. By setting the thickness of the light-scattering sheet 10 to be very small, which is equal to or smaller than 1 mm, as above, it becomes possible to achieve a so-called paper display easily.

When the light-scattering sheet 10 is set to have a thickness of 10 μm to 300 μm, the length of the through hole 15 in the vertical direction in the figure also is 10 μm to 300 μm. Thus, the conductive liquid 21 can be flowed in and out of the through hole 15 having a diameter of 0.1 μm to 100 μm and a length of 10 μm to 300 μm at a high speed by the electrowetting phenomenon.

The through hole 15 can be formed by a suitable method such as a photolithography method, an anodic oxidation method, an etching method, a dyeing method or a printing method.

The upper electrode substrate 14 and the lower electrode substrate 12 are formed using a transparent resin sheet similar to the light-scattering sheet 10 so as to have a thickness of 100 to 1000 μm. Also, each of the upper space 13 and the lower space 11 has a gap of 5 to 1000 μm in the vertical direction of the figure. It should be noted that this gap is the corresponding dimension between the water-repellent films 41 and 43 or between the water-repellent films 45 and 47.

Herein, specific processes of manufacturing the display device in the present embodiment will be described.

As the light-scattering sheet 10, a white scattering sheet (with a thickness of 75 μm) manufactured by FUJICOPIAN CO., LTD. was used. This white scattering sheet was made of a material obtained by kneading a PET resin with fine particles of titanium oxide so that white was achieved by the fine particles of titanium oxide.

After $SiO_2$ films as buffer layers (surface reforming films) were deposited on the surfaces of the light-scattering sheet 10 by the sputtering method, ITO films as transparent electrodes were deposited by the sputtering method, thus forming the upper electrode 31B on the lower side of the upper space 13 and the lower electrode 32B on the upper side of the lower space 11. The $SiO_2$ films had a thickness of 30 nm, and the ITO films had a thickness of 100 nm.

The light-scattering sheet 10 was provided with the through holes 15 having a diameter of 30 μmφ and a depth of 75 μm by an excimer laser processing using a mask with a large number of apertures. Incidentally, it also was possible to form the through holes by a micro-drill processing instead of the excimer laser processing.

A parylene film was formed on the ITO film surfaces on both the upper and lower surfaces of the light-scattering sheet 10 provided with the through holes 15 by a vapor deposition method, thus forming the dielectric layers 42 and 44 having a thickness of 1 μm. Furthermore, the water-repellent films 43 and 45 manufactured by Fluoro Technology were formed on the surfaces of the dielectric layers 42 and 44, respectively, by a dipping method. Thereafter, they were burned at 80° C. for 30 minutes. These water-repellent films 43 and 45 had a thickness of 20 nm.

In order to form the common electrode 30 inside the through holes 15 in the light-scattering sheet 10, an oblique deposition method was employed. More specifically, as the common electrode 30, an aluminum electrode material was deposited by the oblique deposition method.

The upper electrode substrate 14 was formed of a transparent PET resin, and on its surface opposed to the upper space 13, the upper electrode 31A formed of an $SiO_2$ film and an ITO film, the dielectric layer 40 formed of a parylene film and the water-repellent film 41 were formed in this order similarly to the light-scattering sheet 10. Likewise, the lower electrode substrate 12 was formed of a transparent PET resin, and the lower electrode 32A formed of an $SiO_2$ film and an ITO film, the dielectric layer 46 formed of a parylene film and the water-repellent film 47 were formed thereon in this order.

Next, in order to form the lower space 11 having a gap of 10 μm between the lower electrode substrate 12 and the light-scattering sheet 10, a resin spacer 10 μm in width and 10 μm in height was formed. Subsequently, a white UV curable resin was expelled to a peripheral portion of each of the through holes 15 using an ink jet method and allowed to solidify, thereby forming white partition walls W2 so that the conductive liquids 21 colored in predetermined colors of any of R, G and B were not mixed with each other.

Then, an ionic liquid (manufactured by Koei Chemical Co., Ltd.; trade name: IL-A4), which was an ambient temperature molten salt made of aliphatic amine and was a nonaqueous solution, was filled as the conductive liquid 21 into the through holes 15 and the lower space 11. Thereafter, by adding a predetermined pigment to the conductive liquid 21, the conductive liquid 21 was colored in any of R, G and B.

Subsequently, in order to form the upper space 13 having a gap of 10 μm between the upper electrode substrate 14 and the light-scattering sheet 10, a resin spacer 10 μm in width and 10 μm in height was formed. Then, a white UV curable resin was expelled to a peripheral portion of each of the through holes 15 using an ink jet method and allowed to solidify, thereby forming white partition walls W1. Thereafter, an oil (n-dodecane; manufactured by Kishida Chemical Co., Ltd.) as the nonpolar oil 22 was filled into the upper space 13, and the upper electrode substrate 14 was attached and fixed onto the partition walls W1.

Subsequently, the upper electrode 31 and the lower electrode 32 were connected to one end of the alternating-current power supply 39 via the upper switch 35 and the lower switch 37, respectively. Further, the common electrode 30 was connected to the other end of the alternating-current power supply 39, thus completing the display device. As the alternating-current power supply 39, a power supply capable of applying an alternating voltage of 40 V at a frequency of 10 KHz was used.

Then, when the upper switch 35 was turned ON while the through holes 15 and the lower space 11 were filled with the conductive liquid 21 and the upper space 13 was filled with the nonpolar oil 22, the conductive liquid 21 was ejected from the through holes 15 to the inside of the upper space 13 and spread out inside the upper space 13. On the other hand, when the upper switch 35 was turned OFF and the lower switch 37 was turned ON, the conductive liquid 21 spread from the inside of the upper space 13 via the through holes 15 toward the inside of the lower space 11. It was possible to confirm the operation in which the conductive liquid 21 was replaced with the nonpolar oil 22.

The following is a specific description of the operation of the display device of the present embodiment constituted as above.

In the display device constituted as above, by a voltage control of turning ON or OFF the upper switch 35 and the lower switch 37 alternately, the conductive liquid 21 is moved to the upper space 13 and the lower space 11 alternately via the through hole 15 by the electrowetting phenomenon.

In other words, as shown in FIG. 1, when the upper switch 35 is in an ON state and the lower switch 37 is in an OFF state, the conductive liquid 21 is present inside the upper space 13. At this time, the display color on the display surface side is a predetermined color of the conductive liquid 21.

On the other hand, as shown in FIG. 2, when the upper switch 35 is in the OFF state and the lower switch 37 is in the ON state, the conductive liquid 21 in the upper space 13 moves to the through hole 15 or toward the inside of the lower space 11, thus exposing the light-scattering surface of the light-scattering sheet 10. Consequently, the display color on the display surface side becomes white.

More specifically, when the upper switch 35 is in the ON state and the lower switch 37 is in the OFF state, the wettability of the conductive liquid 21 with respect to the surfaces of the water-repellent films 41 and 43 varies in the upper space 13 on the side of the upper electrode 31 supplied with a voltage. As a result, an interfacial tension and a contact angle between the conductive liquid 21 and the above-noted surfaces decrease. Accordingly, the conductive liquid 21 is drawn by an external tension, which has increased relatively, moved from the through hole 15 toward the upper space 13 and spreads out inside the upper space 13.

On the other hand, when the upper switch 35 is in the OFF state and the lower switch 37 is in the ON state, the electric field is removed from the upper electrode 31. As a result, the external tension with respect to the conductive liquid 21 returns to an intrinsic interfacial tension of the conductive liquid 21 itself, so that the conductive liquid 21 is drawn toward the through hole 15 and returns from the through hole 15 toward the lower space 11. Furthermore, since the lower electrode 32 is turned ON, the conductive liquid 21 is sucked from the upper space 13 via the through hole 15 toward the lower space 11, so that the conductive liquid 21 can be moved at a high speed.

As described above, the display device is constituted as a double electrode structure in which the response speed can be raised by controlling both of the inflow of the conductive liquid 21 to the upper space 13 and the outflow of the conductive liquid 21 from the upper space 13 by the voltage control of both of the upper electrode 31 and the lower electrode 32.

At the time of moving the conductive liquid 21 between the upper space 13 and the lower space 11 by the voltage control of switching between applying and removing the voltage as described above, the nonpolar oil 22 is moved to a position replaced with the conductive liquid 21.

In other words, when the conductive liquid 21 in the upper space 13 moves toward the lower space 11, the nonpolar oil 22 in the lower space 11 goes up from the inside of the lower space 11 and flows to the side of the upper space 13. Conversely, when the conductive liquid 21 in the lower space 11 moves toward the upper space 13, the nonpolar oil 22 in the upper space 13 goes down from the upper space 13 and returns to the side of the lower space 11.

In this manner, by turning ON/OFF the upper switch 35 and the lower switch 37 alternately so as to allow the conductive liquid 21 to be present in the upper space 13 while the voltage is applied to the upper electrode 31, a colored display is carried out on the display surface side. On the other hand, when the conductive liquid 21 is moved from the upper space 13 via the through hole 15 to the lower space 11, the upper space 13 achieves a white display because the conductive liquid 21 is not present any more.

Also, in the display device, as described above, each pixel is partitioned off by the partition walls W1 and W2, so that the driving portion can move the conductive liquid 21 toward the upper space 13 or the lower space 11 in each pixel. Consequently, in the display device, individual colors of R, G and B are displayed by allowing the conductive liquid 21 colored in its corresponding color to flow into the side of the upper space 13. Further, by allowing all the conductive liquids 21 to flow into the corresponding upper spaces 13 in the adjacent pixels of R, G and B, all of the external light can be absorbed, thus achieving a black display on the display surface side.

As described above, in the present embodiment, the conductive liquid (liquid) 21 is prepared using the ionic liquid containing the ambient temperature molten salt combining the cation and anion described above. Also, in this conductive liquid 21, the amount of water blended in 100 parts by weight of the ionic liquid is restricted to equal to or lower than 10 parts by weight. This makes it possible both to reduce the voltage applied to the liquid unlike the above-described conventional examples and to prevent the malfunction due to an adverse effect of an ambient temperature in a reliable manner. Thus, a display device with an excellent operation performance that can be driven at a low voltage can be achieved.

In other words, the display devices in the first and second conventional examples described above, water, an aqueous solution in which an electrolyte is dissolved, alcohol, acetone or a mixture thereof has been used as the above-described conductive liquid. Because of its low potential window, the conductive liquid has caused a dielectric breakdown easily in the dielectric layer covering the electrode. In particular, since the ionic radius of water is small, water and an aqueous solution containing many water molecules have permeated the above-noted dielectric layer easily. Further, because the electrode has needed to be supplied with a high voltage, water and an aqueous solution have been very likely to cause a dielectric breakdown in the dielectric layer.

Also, the conductive liquid in the display devices in the first and second conventional examples is nonvolatile and may generate a certain vapor pressure. In other words, when the ambient temperature reaches a high temperature region, the vapor pressure of the conductive liquid is generated inside the display device so as to expand the volume of the inner space of this device considerably, so that the device may be broken. Furthermore, since this conventional product includes combustible materials, the conductive liquid may leak out and further ignites when failures due to shocks, deterioration or volumetric expansion (an increase in the inner pressure) occur in the display device.

In contrast, in the present embodiment, the nonaqueous ionic liquid containing equal to or smaller than 10 parts by weight of water, preferably containing no water at all, is used as the conductive liquid 21. Therefore, in conjunction with the high ionic conductivity and the low viscosity as described above, it is possible to reduce the voltage to be applied to the conductive liquid 21, thus driving the display device at a low voltage. Also, the conductive liquid 21 in the present embodiment has not only an excellent thermal stability but also a wide liquid-phase temperature region. Thus, even when the ambient temperature reaches a high temperature region, the conductive liquid 21 hardly vaporizes and generates almost no vapor pressure. Accordingly, unlike the conventional examples described above, it is possible to prevent the malfunction due to the adverse effect of the ambient temperature in a reliable manner, thereby improving an operation performance. Furthermore, since the conductive liquid 21 does not contain combustible materials, no fire is caused unlike the conventional examples described above even if the conductive liquid 21 should leak out from the display device.

Alternatively to the above description, the upper electrode 31A and the lower electrode 32A respectively may be buried into the upper electrode substrate 14 and the lower electrode substrate 12 that are formed of an insulating material. In that case, it becomes possible to omit the dielectric layer 40 on the upper electrode substrate 14 and the dielectric layer 46 on the lower electrode substrate 12.

Further, alternatively to the above description, a communication space that has a rectangular cross-section and a rectangular-parallelepiped shape also may be used instead of the through hole 15.

First Modified Embodiment

Figure 3A:
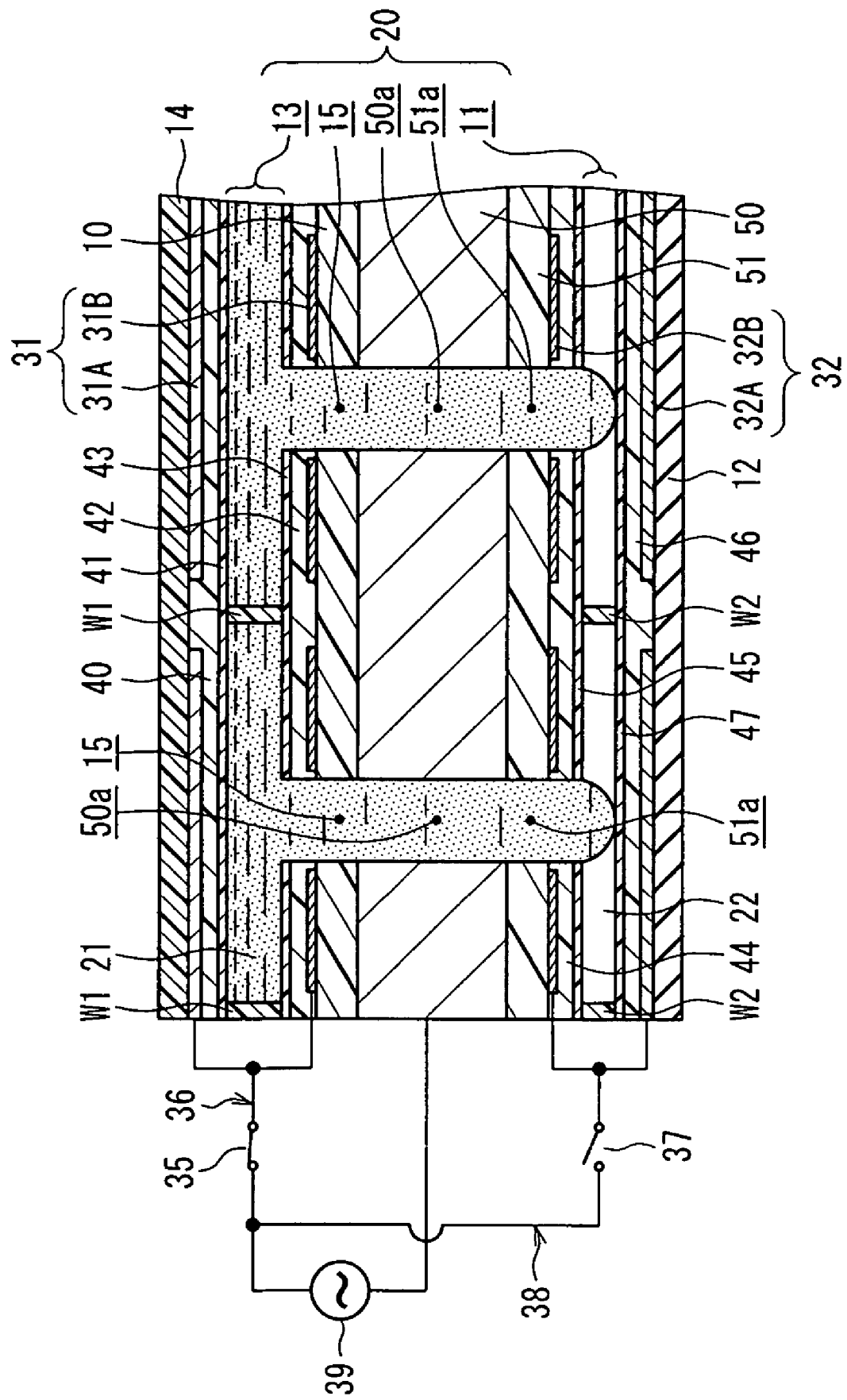
FIG. 3A is a sectional view showing a configuration of a main portion of a first modified embodiment of the display device and the image display shown in FIG. 1 in the state of displaying a color resulting from the liquid.
Figure 3B:
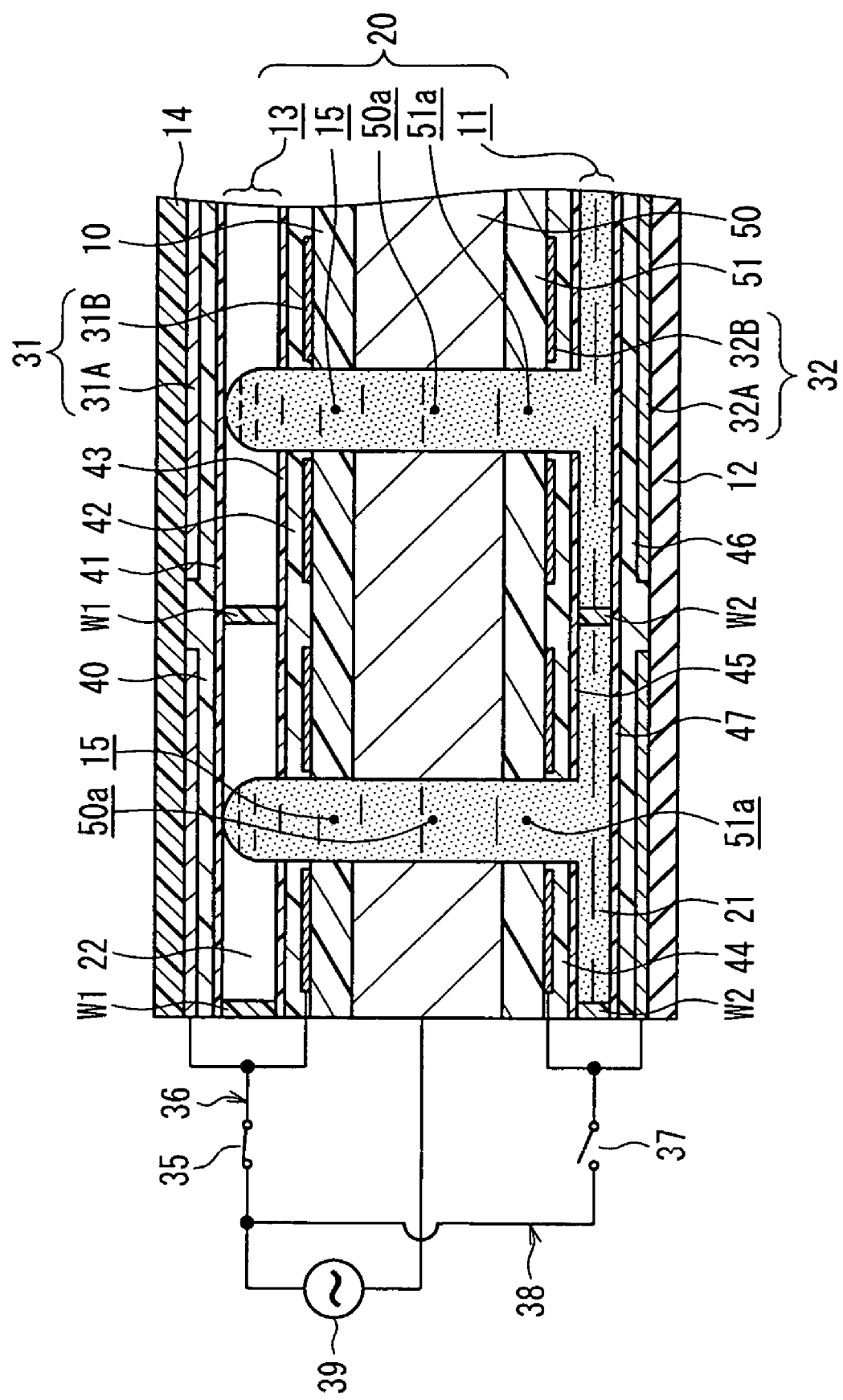
FIG. 3B is a sectional view showing the configuration of the main portion of the display device and the image display shown in FIG. 3A in the state of displaying white.

FIG. 3A is a sectional view showing a configuration of a main portion of a first modified embodiment of the display device and the image display shown in FIG. 1 in the state of displaying a color resulting from the liquid. FIG. 3B is a sectional view showing the configuration of the main portion of the display device and the image display shown in FIG. 3A in the state of displaying white. In these figures, a main difference between the present modified embodiment and Embodiment 1 described above lies in the use of a conductive metal thin film as the common electrode. Incidentally, elements provided in common with Embodiment 1 described above are given the same reference numerals, and the redundant description thereof will be omitted here.

As shown in FIGS. 3A and 3B, in the present modified embodiment, a thinner light-scattering sheet 10 is used, and a common electrode sheet 50 and an insulating sheet 51 are layered in this order on this light-scattering sheet 10 on the side of the lower space 11. Also, the light-scattering sheet 10, the common electrode sheet 50 and the insulating sheet 51 respectively are provided with the through hole 15, a through hole 50a and a through hole 51a in each pixel. When the light-scattering sheet 10, the common electrode sheet 50 and the insulating sheet 51 are formed into one piece, the through hole 15, the through hole 50a and the through hole 51a achieve communication between the upper space 13 and the lower space 11 so as to constitute a liquid storage portion 20.

The common electrode sheet 50 constitutes the above-described common electrode 30 and is connected to the alternating-current power supply 39. Also, as this common electrode sheet 50, a conductive metal thin film such as an aluminum foil or a copper foil is used. Further, as the insulating sheet 51, a sheet of a synthetic resin, for example, a PET resin or the like is used. The lower electrode 32B, the dielectric layer 44 and the water-repellent film 45 are layered in this order on the surface of the insulating sheet 51 on the side of the lower space 11.

With the configuration described above, the present modified embodiment can produce effects similar to those in Embodiment 1 described above. Also, in the present modified embodiment, since the common electrode sheet 50 simply is layered on the light-scattering sheet 10 unlike Embodiment 1, the processes of manufacturing the display device can be simplified compared with Embodiment 1 in which the common electrode 30 is formed on the inner surface of the through hole 15.

Second Modified Embodiment

Figure 4:
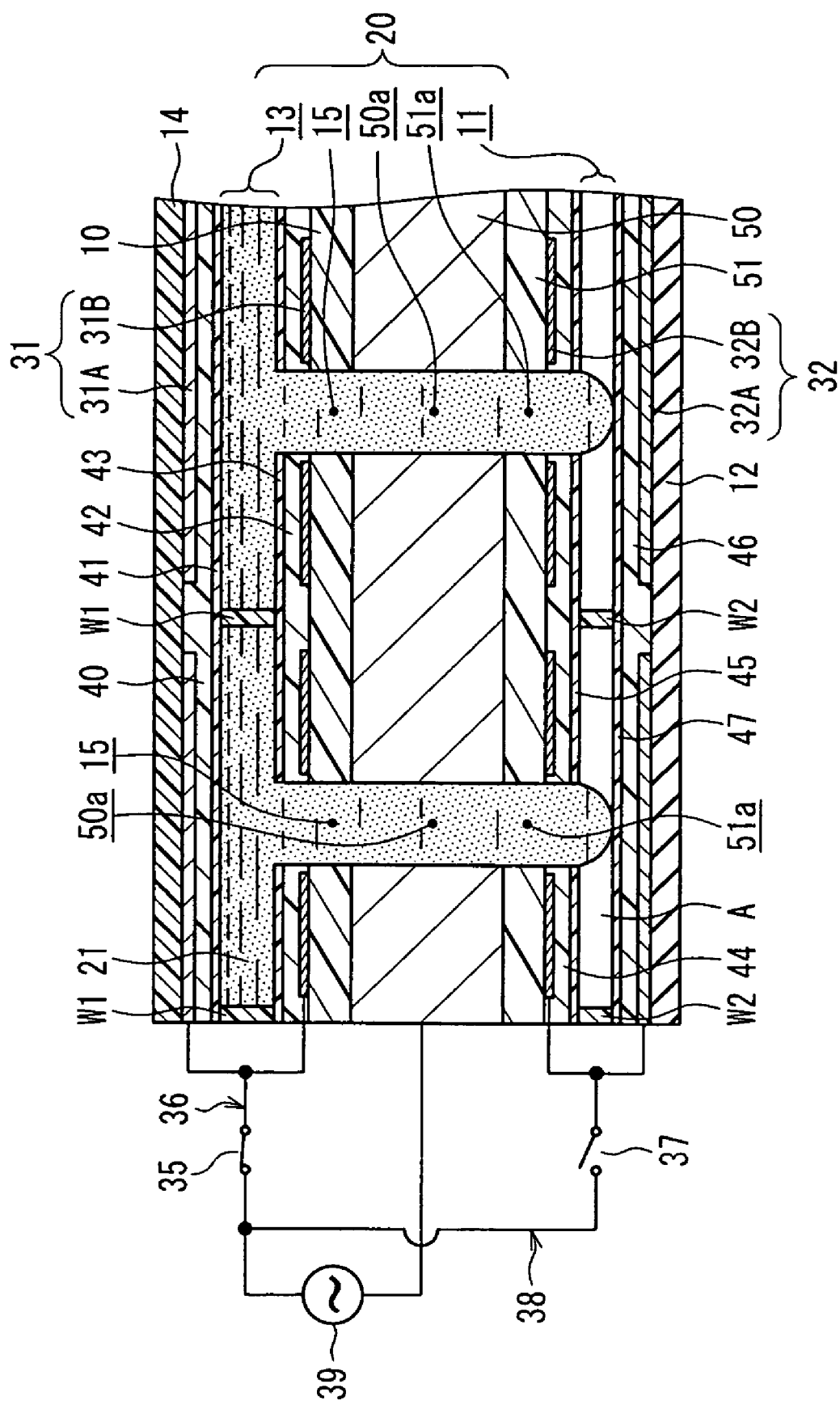
FIG. 4 is a sectional view showing a configuration of a main portion of a second modified embodiment of the display device and the image display shown in FIG. 1 in the state of displaying a color resulting from the liquid.

FIG. 4 is a sectional view showing a configuration of a main portion of a second modified embodiment of the display device and the image display shown in FIG. 1 in the state of displaying a color resulting from the liquid. In this figure, a main difference between the present modified embodiment and the first modified embodiment described above lies in the use of the air instead of the nonpolar oil. Incidentally, elements provided in common with the first modified embodiment described above are given the same reference numerals, and the redundant description thereof will be omitted here.

In FIG. 4, in the present modified embodiment, a transparent air A is sealed so as to be movable in the liquid storage portion 20. This air A has a physical property of not mixing with the conductive liquid 21 and moves inside the liquid storage portion 20 according to the movement of the conductive liquid 21 similarly to the nonpolar oil 22 described above. More specifically, when the conductive liquid 21 is moved toward the lower space 11, the air A moves from the inside of the lower space 11 toward the upper space 13 as shown in FIG. 4. As a result, similarly to the first modified embodiment, the state of displaying the color shown in FIG. 4 changes to the state of displaying white resulting from the light-scattering sheet 10.

With the configuration described above, the present modified embodiment can produce effects similar to those in the first modified embodiment described above.

Moreover, the above description has been directed to the case of using the nonpolar oil or the air, the present invention is not limited to them. Any insulating fluids are appropriate as long as they do not mix with the (conductive) liquid. This also applies to embodiments described below.

Embodiment 2

Figure 5A:
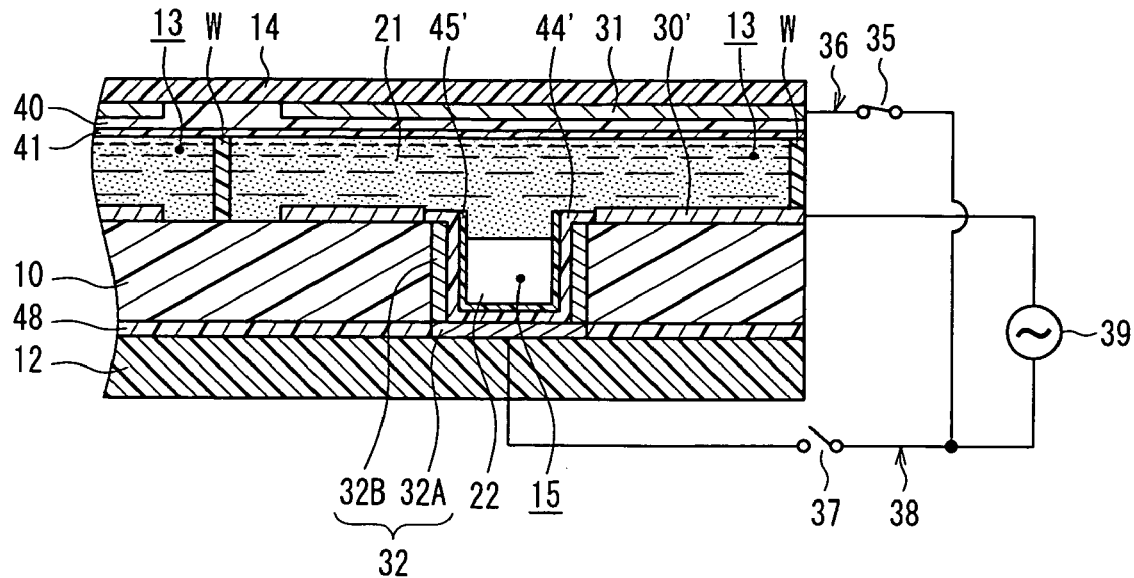
FIG. 5A is a sectional view showing a configuration of a main portion of a display device and an image display according to Embodiment 2 of the present invention in a state of displaying a color resulting from a liquid.
Figure 5B:
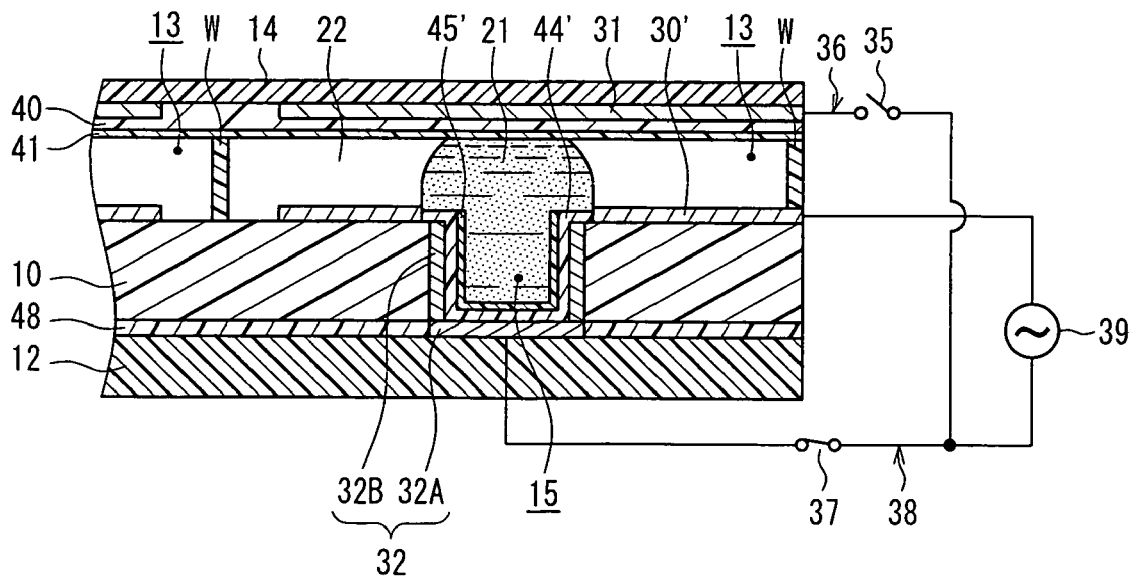
FIG. 5B is a sectional view showing the configuration of the main portion of the display device and the image display shown in FIG. 5A in a state of displaying white.

FIG. 5A is a sectional view showing a configuration of a main portion of a display device and an image display according to Embodiment 2 of the present invention in a state of displaying a color resulting from a liquid. FIG. 5B is a sectional view showing the configuration of the main portion of the display device and the image display shown in FIG. 5A in a state of displaying white. In these figures, a main difference between the present embodiment and Embodiment 1 described above lies in the omission of the above-noted lower space. Incidentally, elements provided in common with Embodiment 1 described above are given the same reference numerals, and the redundant description thereof will be omitted here.

As shown in FIGS. 5A and 5B, in the present embodiment, the light-scattering sheet 10 and the lower electrode substrate 12 are layered via an adhesive layer 48.

Further, in a central portion of each pixel region of the light-scattering sheet 10, a through hole 15 penetrating through the light-scattering sheet 10 in its thickness direction (the vertical direction in the figures) is provided. This through hole 15 constitutes a liquid storage space, and one end thereof is in communication with the upper space 13. Also, the other end of the through hole 15 is closed airtightly by a lower electrode 32A, which will be described later. Then, in the present embodiment, the through hole 15 and the upper space 13 form a liquid storage portion having a T-shaped cross-section in each pixel. Also, in this liquid storage portion, the conductive liquid 21 and the nonpolar oil 22 are sealed similarly to Embodiment 1. In addition, the conductive liquids 21 that are colored in different colors are sealed in two adjacent liquid storage portions divided by the partition wall W, so that display colors on the display surface side can be corresponding colors of R, G and B.

Further, the lower electrode 32 is provided in the light-scattering sheet 10 and the lower electrode substrate 12 so as to surround the through hole 15. More specifically, on an upper surface of the lower electrode substrate 12, the lower-side lower electrode 32A is provided so as to close a lower end opening of the through hole 15. Also, in the light-scattering sheet 10, a cylindrical lower electrode 32B is provided on the surface opposed to the through hole 15. Then, these lower electrodes 32A and 32B are connected electrically with each other and connected to one end of the alternating-current power supply 39 via the lower switch 37. Moreover, similarly to Embodiment 1, a dielectric layer 44' and a water-repellent film 45' are layered in this order on the surface of the lower electrode 32.

Further, a common electrode 30' is formed on the surface of the light-scattering sheet 10 on the side of the upper space 13. This common electrode 30' is made of a transparent conductive film such as an ITO film and connected to the other end of the alternating-current power supply 39. Also, the upper electrode 31 is provided on the side of the upper electrode substrate 14 such that the upper space 13 is interposed between the upper electrode 31 and the common electrode 30'. This upper electrode 31 is connected to the one end of the alternating-current power supply 39 via the upper switch 35.

In the present embodiment constituted as above, when the upper switch 35 and the lower switch 37 respectively are switched from the state shown in FIG. 5A to the OFF state and the ON state, the conductive liquid 21 moves from the inside of the upper space 13 toward the inside of the through hole 15 and the nonpolar oil 22 flows into the upper space 13 as shown in FIG. 5B. As a result, white resulting from the light-scattering sheet 10 is displayed on the display surface.

On the other hand, when the upper switch 35 and the lower switch 37 respectively are switched from the state shown in FIG. 5B to the ON state and the OFF state, the conductive liquid 21 moves from the inside of the through hole 15 toward the inside of the upper space 13 and the nonpolar oil 22 returns to the inside of the through hole 15 as shown in FIG. 5A. As a result, the color resulting from the conductive liquid 21 is displayed on the display surface.

With the configuration described above, the present embodiment can produce effects similar to those in Embodiment 1 described above. Also, in the present embodiment, since the light-scattering sheet 10 and the lower electrode substrate 12 are joined directly via the adhesive layer 48 without providing the lower space therebetween unlike Embodiment 1, the dimension of the display device in its thickness direction can be reduced easily, thereby achieving a compact display device more easily.

Alternatively to the above description, the upper electrode 31 may be buried into the upper electrode substrate 14 formed of an insulating material. In that case, it becomes possible to omit the dielectric layer on the upper electrode substrate 14.

Further, instead of the through hole 15 described above, a recessed portion formed in the light-scattering sheet 10 may be used as the liquid storage space described above. In other words, a liquid storage space with a bottom also may be used. Moreover, instead of the through hole 15, it also may be possible to use a liquid storage space that has a rectangular cross-section and a rectangular-parallelepiped shape or form a liquid storage space by two or more through holes.

Embodiment 3

Figure 6A:
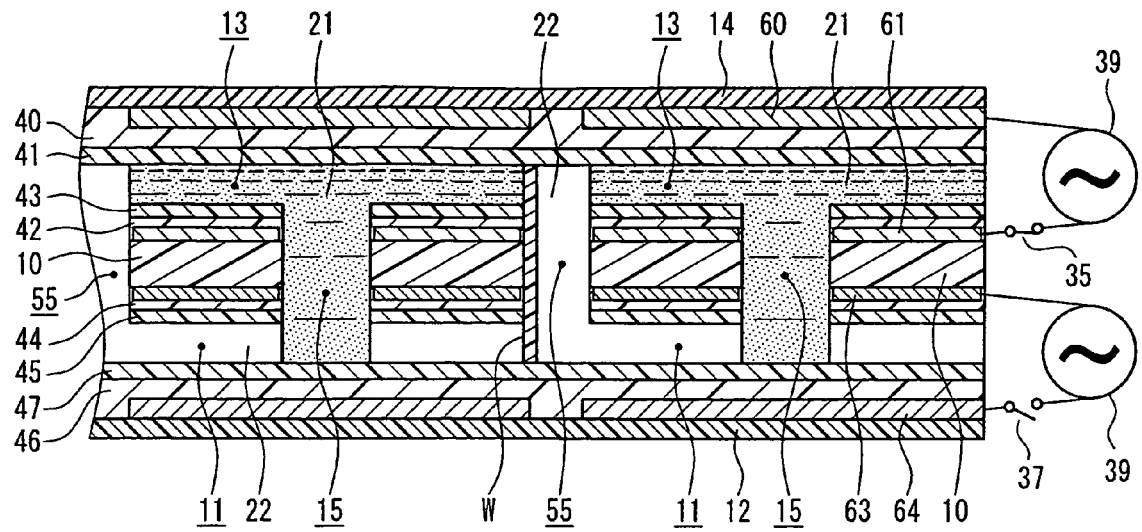
FIG. 6A is a sectional view showing a configuration of a main portion of a display device and an image display according to Embodiment 3 of the present invention in a state of displaying a color resulting from a liquid.
Figure 6B:
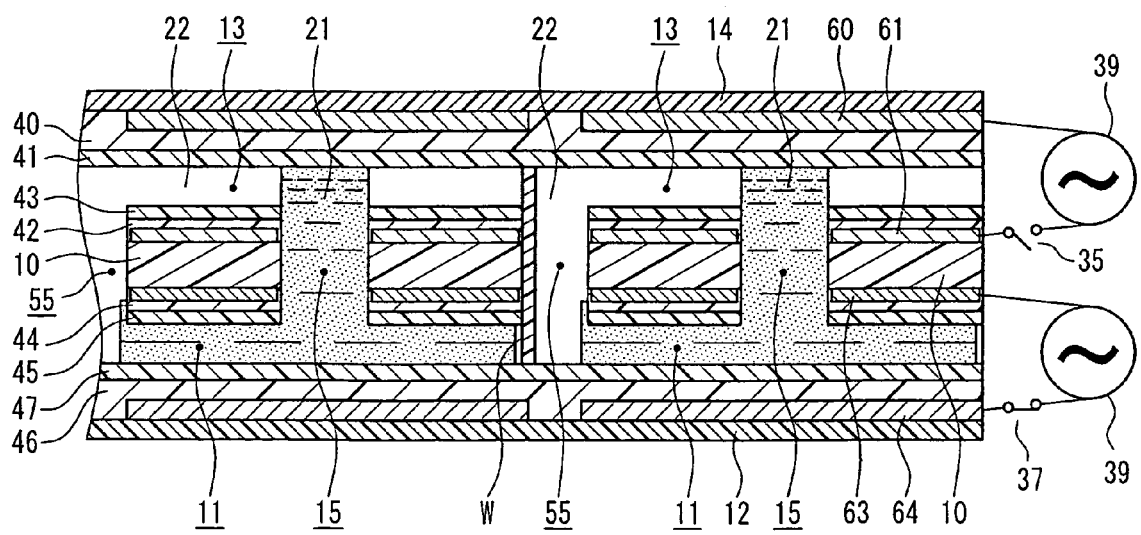
FIG. 6B is a sectional view showing the configuration of the main portion of the display device and the image display shown in FIG. 6A in a state of displaying white.

FIG. 6A is a sectional view showing a configuration of a main portion of a display device and an image display according to Embodiment 3 of the present invention in a state of displaying a color resulting from a liquid. FIG. 6B is a sectional view showing the configuration of the main portion of the display device and the image display shown in FIG. 6A in a state of displaying white. In these figures, a main difference between the present embodiment and Embodiment 1 described above lies in the formation of two through holes serving as a communication space in one pixel region. Incidentally, elements provided in common with Embodiment 1 described above are given the same reference numerals, and the redundant description thereof will be omitted here.

As shown in FIGS. 6A and 6B, in the present embodiment, a through hole 55 serving as a communication space allowing the upper space 13 and the lower space 11 to communicate with each other on the left side of the figure is provided in each pixel region. More specifically, in the present embodiment, in addition to the through hole 15 formed in the central portion of the pixel region, the through hole 55 whose upper end opening and lower end opening are formed respectively in the upper space 13 and the lower space 11 is provided on one end (left end) of this pixel region. Also, in the present embodiment, two adjacent pixel regions are divided by a partition wall W, and the through holes 15 and 55, the upper space 13 and the lower space 11 form a liquid storage portion in each pixel. Then, in the present embodiment, the conductive liquid 21 flows toward the upper space 13 or the lower space 11 via the inside of the through hole 15 and the nonpolar oil 22 flows toward the lower space 11 or the upper space 13 via the inside of the through hole 55 according to this inflow (movement) of the conductive liquid 21, thereby performing an operation of changing a display color on the display surface side.

Further, in the present embodiment, two alternating-current power supplies 39 are provided, so that the conductive liquid 21 can be moved inside the liquid storage portion described above without providing the common electrode. More specifically, an upper-side upper electrode 60 is provided on the lower surface of the upper electrode substrate 14 so as to cover the display surface side of the upper space 13. Also, on the side of the light-scattering sheet 10, a lower-side upper electrode 61 is provided on the surface opposed to the upper space 13 except for the openings of the through holes 15 and 55. These upper electrodes 60 and 61 are made of a transparent electrode using an ITO film or the like and connected to the alternating-current power supply 39 on the upper side via the upper switch 35. Moreover, the dielectric layer 40 and the water-repellent film 41 are layered in this order on the surface of the upper electrode 60, and the dielectric layer 42 and the water-repellent film 43 are layered in this order on the surface of the upper electrode 61.

Further, a lower-side lower electrode 64 is provided on the upper surface of the lower electrode substrate 12 so as to cover the non-display surface side of the lower space 11. Also, on the side of the light-scattering sheet 10, an upper-side lower electrode 63 is provided on the surface opposed to the lower space 11 except for the openings of the through holes 15 and 55. These lower electrodes 63 and 64 are electrodes made of a metal such as aluminum or copper and connected to the alternating-current power supply 39 on the lower side via the lower switch 37. Moreover, the dielectric layer 44 and the water-repellent film 45 are layered in this order on the surface of the lower electrode 63, and the dielectric layer 46 and the water-repellent film 47 are layered in this order on the surface of the lower electrode 64.

In the present embodiment constituted as above, when the upper switch 35 and the lower switch 37 are turned ON and OFF respectively, the conductive liquid 21 spreads out inside the upper space 13, so that the color resulting from the conductive liquid 21 is displayed on the display surface as shown in FIG. 6A.

On the other hand, when the upper switch 35 and the lower switch 37 are turned OFF and ON respectively, the conductive liquid 21 moves to the inside of the lower space 11 and the nonpolar oil 22 spreads out inside the upper space 13 as shown in FIG. 6B, so that white resulting from the light-scattering sheet 10 is displayed on the display surface.

With the configuration described above, the present embodiment can produce effects similar to those in Embodiment 1 described above. Also, in the present embodiment, the conductive liquid 21 and the nonpolar oil 22 respectively flow into one side and the other side of the upper space 13 and the lower space 11 via the inside of the through holes 15 and 55, thereby performing the operation of changing the display color on the display surface side, making it easier to achieve a faster changing operation.

Moreover, alternatively to the above description, instead of the through holes 15 and 55, it also may be possible to use communication spaces that have a rectangular cross-section and a rectangular-parallelepiped shape. Also, instead of the through holes 15 and 55, it also may be possible to provide a through hole allowing the upper space 13 and the lower space 11 to communicate with each other on the right side of the figure, or omit the through hole 15 in the central portion so that the two through holes on the right and left sides and the upper and lower spaces form a liquid storage portion with a frame-shaped cross-section.

Embodiment 4

Figure 7A:
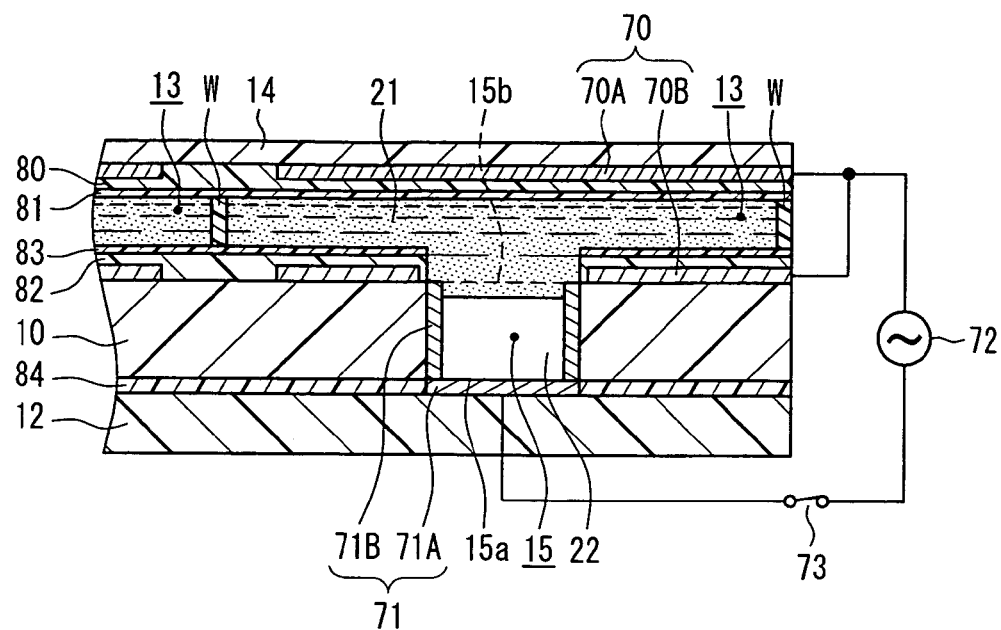
FIG. 7A is a sectional view showing a configuration of a main portion of a display device and an image display according to Embodiment 4 of the present invention in a state of displaying a color resulting from a liquid.
Figure 7B:
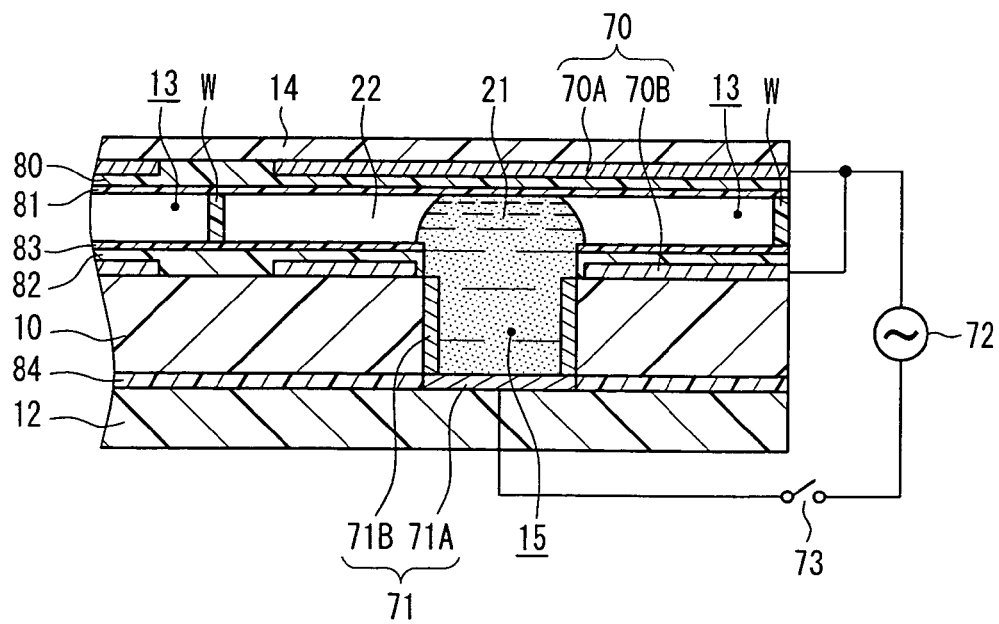
FIG. 7B is a sectional view showing the configuration of the main portion of the display device and the image display shown in FIG. 7A in a state of displaying white.

FIG. 7A is a sectional view showing a configuration of a main portion of a display device and an image display according to Embodiment 4 of the present invention in a state of displaying a color resulting from a liquid. FIG. 7B is a sectional view showing the configuration of the main portion of the display device and the image display shown in FIG. 7A in a state of displaying white. In these figures, a main difference between the present embodiment and Embodiment 1 described above lies in a two-terminal structure in which the common electrode is omitted and omitting of the lower space. Incidentally, elements provided in common with Embodiment 1 described above are given the same reference numerals, and the redundant description thereof will be omitted here.

As shown in FIGS. 7A and 7B, in the present embodiment, the lower electrode substrate 12 is layered on the lower surface of the light-scattering sheet 10 via an adhesive layer 84.

In a central portion of each pixel region of the light-scattering sheet 10, a through hole 15 penetrating through the light-scattering sheet 10 in its thickness direction (the vertical direction in the figures) is provided. This through hole 15 constitutes a liquid storage space, and one end thereof is in communication with the upper space 13 constituting a display space. In other words, the lower end opening 15a of the through hole 15 is located on the surface of the lower electrode substrate 12 and closed airtightly by a second electrode 71A, which will be described later. On the other hand, the upper end opening 15b is formed so that the through hole 15 is in communication with the central portion of the upper space 13, and the through hole 15 and the upper space 13 form a liquid storage portion having a T-shaped cross-section in each pixel. Also, in this liquid storage portion, the conductive liquid 21 and the nonpolar oil 22 are sealed similarly to Embodiment 1. In addition, the conductive liquids 21 that are colored in different colors are sealed in two adjacent liquid storage portions divided by the partition wall W, so that display colors on the display surface side can be corresponding colors of R, G and B.

Further, in the present embodiment, a transparent first electrode 70 is provided on a surface opposed to the upper space 13 for the purpose of applying a voltage to or removing a voltage from the conductive liquid 21 so as to move the conductive liquid 21 and replace it with the nonpolar oil 22. More specifically, an upper-side first electrode 70A is provided on the lower surface of the upper electrode substrate 14 so as to cover the display surface side of the upper space 13. Also, on the side of the light-scattering sheet 10, a lower-side first electrode 70B is provided on the surface opposed to the upper space 13 except for the opening of the through hole 15. These first electrodes 70A and 70B are transparent electrodes using an ITO film or the like and connected electrically with each other.

On the other hand, a second electrode 71 is provided in the light-scattering sheet 10 and the lower electrode substrate 12 so as to surround the through hole 15. More specifically, on an upper surface of the lower electrode substrate 12, a lower-side second electrode 71A is provided so as to dose a lower end opening 15a of the through hole 15. Also, in the light-scattering sheet 10, a cylindrical second electrode 71B is provided on the surface opposed to the through hole 15. These second electrodes 71A and 71B are connected electrically with each other. Further, the second electrode 71A is a transparent electrode using an ITO film or the like. Moreover, the second electrode 71B is an electrode made of a metal such as aluminum or copper and formed by a vacuum evaporation method, a sputtering method, an ion plating method, a dip coating method or the like.

Further, the first electrode 70 and the second electrode 71 are connected to an alternating-current power supply 72 via a switch 73. The application of the electric field to the conductive liquid 21 is started/stopped according to operations of closing/opening the switch 73. Also, the switch 73 and the alternating-current power supply 72 constitute a driving portion for moving the conductive liquid 21 toward the upper space 13 or the through hole 15 according to the operations of closing/opening the switch 73 so as to change a display color on the display surface side, and the conductive liquid 21 is moved by the electrowetting phenomenon.

The surfaces of the first electrodes 70A and 70B are provided with dielectric layers 80 and 82, respectively. Also, the surfaces of the dielectric layers 80 and 82 are provided with insulating water-repellent films 81 and 83, respectively, which are in contact with the conductive liquid 21 or the nonpolar oil 22.

The dielectric layers 80 and 82 are formed of a high dielectric film containing parylene or aluminum oxide, for example, and have a thickness of about 1 to 0.1 μm. Also, the water-repellent films 81 and 83 preferably become layers having an affinity for the conductive liquid 21 at the time of applying a voltage. More specifically, a fluorocarbon resin is preferable.

Alternatively to the above description, the surface of the second electrode 71 also can be provided with a coating that becomes lipophilic in an ON (closed) state of the switch 73 and becomes lipophobic in an OFF (opened) state of the switch 73, thereby improving a moving speed of the nonpolar oil 22 at the time of the operation of opening/closing the switch 73, so that the moving speed of the conductive liquid 21 can be raised as well. However, as shown in FIGS. 7A and 7B, it is more preferable that the conductive liquid 21 constantly is in contact with a part of the second electrode 71 regardless of the opening/closing operation of the switch 73 so as to apply the voltage to this conductive liquid 21 directly, because the moving speed of the conductive liquid 21 can be improved easily.

In the present embodiment constituted as above, when the switch 73 is turned ON, the wettability of the conductive liquid 21 with respect to the surfaces of the water-repellent films 81 and 83 on the side of the upper space 13 of the first electrode 70 supplied with a voltage varies, thus decreasing an interfacial tension and a contact angle between the conductive liquid 21 and the above-noted surfaces. Accordingly, the conductive liquid 21 is drawn by an external tension, which has increased relatively, moved from the side of the through hole 15 toward the upper space 13 and spreads out inside the upper space 13.

On the other hand, when the switch 73 is turned OFF, the voltage is removed from the first electrode 70. Then, the external tension with respect to the conductive liquid 21 returns to an intrinsic interfacial tension of the conductive liquid 21 itself, so that the conductive liquid 21 is drawn toward the through holes 15 and returns to the through hole 15.

At the time of moving the conductive liquid 21 between the upper space 13 and the through hole 15 by the voltage control of switching between applying and removing the voltage as described above, the nonpolar oil 22 is moved to a position replaced with the conductive liquid 21.

In other words, when the conductive liquid 21 in the upper space 13 moves toward the through hole 15, the nonpolar oil 22 in the through hole 15 goes up from the inside of the through hole 15 and flows to the side of the upper space 13. Conversely, when the conductive liquid 21 in the through hole 15 moves toward the upper space 13, the nonpolar oil 22 in the upper space 13 goes down from the upper space 13 and returns to the side of the through hole 15.

In this manner, by turning ON the switch 73 so as to allow the conductive liquid 21 to be present in the upper space 13 while the voltage is applied to the first electrode 70, a color resulting from the conductive liquid 21 can be displayed on the display surface side. On the other hand, by turning OFF the switch 73 so as to allow the conductive liquid 21 to return from the upper space 13 to the side of the through hole 15 while the voltage is not applied to the first electrode 70, the conductive liquid 21 is replaced with the transparent nonpolar oil 22 inside the upper space 13. Thus, the upper surface (light-scattering surface) of the light-scattering sheet 10 is exposed to the display surface side, thereby displaying white.

With the configuration described above, the present embodiment can produce effects similar to those in Embodiment 1 described above. Also, in the present embodiment, since no lower space is formed, it is possible to achieve a more simple structure of the display device compared with that in Embodiment 1, thus constituting a compact display device more easily. Furthermore, since no common electrode is provided in the present embodiment, it is possible both to reduce the number of components in the display device and to constitute a display device that has a simple structure and is easy to manufacture.

Alternatively to the above description, the first electrode 70 may be buried into the upper electrode substrate 14 formed of an insulating material, for example. In that case, it becomes possible to omit the dielectric layer on the upper electrode substrate 14.

In addition, alternatively to the above description, instead of the through hole 15, it also may be possible to use a liquid storage space that has a rectangular cross-section and a rectangular-parallelepiped shape. Also, a liquid storage space can be formed by two or more through holes.

The following is a specific description of a verification test conducted by the inventors of the present application.

This verification test was conducted to verify that, as illustrated in the first and second examples below, the use of the conductive liquid 21 reduced a drive voltage and improved an operation performance in the display devices in the respective embodiments described above.

FIRST EXAMPLE

Figure 8:
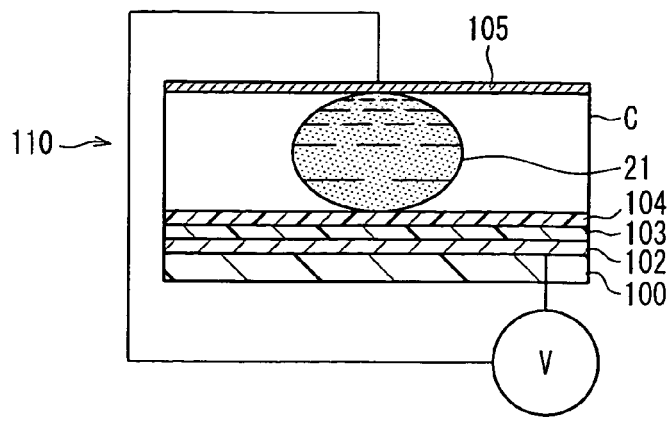
FIG. 8 is a drawing for describing a display device in a first example of the present invention.

In FIG. 8, a display device 110 in the first example was provided with a case C serving as an outer container of this display device 110 and a substrate 100 disposed in a bottom portion of the case C. A 0.7 mm thick non-acrylic glass sheet was used as the substrate 100, and a plurality of lower electrodes 102 formed of a 170 nm thick ITO film were provided on the surface of this substrate 100. These lower electrodes 102 were arranged as stripes at predetermined intervals in a direction perpendicular to the paper surface and attached to the surface of the substrate 100 with an UV curable adhesive.

Further, in the display device 110, a dielectric layer 103 and a water-repellent film 104 were layered in this order so as to cover the lower electrodes 102. As the dielectric layer 103, four kinds of layers whose materials, forming methods, dielectric constants or thicknesses were different were used as shown in Table 1 below. As the water-repellent film 104, a 20 nm thick fluorocarbon resin film (FG-5010 manufactured by Fluoro Technology) was used. Then, on the water-repellent film 104, an ionic liquid (manufactured by Koei Chemical Co., Ltd.; trade name: IL-A4), which was an ambient temperature molten salt made of aliphatic amine and a nonaqueous solution, was dropped as a droplet of the conductive liquid 21 serving as a test liquid, thereby preparing Test products 1 to 4 corresponding to the present invention as shown in Table 1. Also, on the water-repellent film 104, 1 mmol/L of a KCl aqueous solution was dropped as a droplet of a test liquid, thereby preparing Comparative products 1 to 4 corresponding to conventional products. It should be noted that the diameter of the dropped droplets was 2 mm in Test products 1 to 4 and Comparative products 1 to 4.

TABLE 1

|  | Dielectric layer | Forming method | Dielectric constant | Thickness (µm) | Test liquid |
|---|---|---|---|---|---|
| Test prod. 1 | Parylene | CVD | 3 | 1 | Conductive liquid |
| Test prod. 2 | Aluminum oxide | Sputtering | 8 | 1 | Conductive liquid |
| Test prod. 3 | Aluminum oxide | Sputtering | 8 | 0.5 | Conductive liquid |
| Test prod. 4 | Aluminum oxide | Sputtering | 8 | 0.1 | Conductive liquid |
| Comp. prod. 1 | Parylene | CVD | 3 | 1 | KCl aqueous solution |
| Comp. prod. 2 | Aluminum oxide | Sputtering | 8 | 1 | KCl aqueous solution |
| Comp. prod. 3 | Aluminum oxide | Sputtering | 8 | 0.5 | KCl aqueous solution |
| Comp. prod. 4 | Aluminum oxide | Sputtering | 8 | 0.1 | KCl aqueous solution |

Further, in Test products 1 to 4 and Comparative products 1 to 4 in the first example, an alternating-current power supply V was connected between the upper electrode 105 and the lower electrode 102 while bringing the upper electrode 105 formed of a copper foil into contact with an upper surface of the corresponding droplets. Moreover, in Test products 1 to 4 and Comparative products 1 to 4, when an application voltage from the alternating-current power supply V was raised in increments of 1 V from 1 V to 100 V at 10 kHz, the state of the droplets of the corresponding test liquids was observed by an optical microscope connected with a high-speed camera. Table 2 shows the test results of Test products 1 to 4 and Comparative products 1 to 4. In this Table 2, the minimum application voltage when the droplet moved is shown, and the case in which the droplet did not move is indicated by "X".

TABLE 2

|  | Test result |
|---|---|
| Test prod. 1 | 40 V |
| Test prod. 2 | 14 V |
| Test prod. 3 | 5 V |
| Test prod. 4 | 4 V |
| Comp. prod. 1 | 80 V |
| Comp. prod. 2 | X |
| Comp. prod. 3 | X |
| Comp. prod. 4 | X |

As becomes clear from Table 2, among the products corresponding to the conventional products, only the droplet in Comparative product 1 having the dielectric layer 103 using a 1 µm thick parylene film moved when the voltage of 80 V or higher was applied. In other words, unless a high voltage of at least 80 V was applied, the droplet did not move.

On the other hand, in all of Comparative products 2 to 4 using aluminum oxide having a high dielectric constant for the dielectric layer 103, a dielectric breakdown occurred in the dielectric layer 103, causing electrolysis in the KCl aqueous solution, so that the droplet of that aqueous solution did not move.

In contrast, in all of Test products 1 to 4 corresponding to the present invention, it was confirmed that the droplets moved. Further, as becomes clear from the results of Test product 1 and Comparative product 1, it was verified that the product corresponding to the present invention could move the droplet at half an application voltage of the product corresponding to the conventional product when the parylene films with the same thickness were used for the dielectric layer 103.

Further, in Test products 2 to 4 using aluminum oxide having a higher dielectric constant than parylene for the dielectric layer 103, it was possible to move the droplets without causing a dielectric breakdown in the dielectric layer 103 or electrolysis of the conductive liquid 21, unlike Comparative products 2 to 4. Moreover, in Test products 2 to 4, it was confirmed that the droplet could be moved at a lower application voltage than Test product 1 and that the application voltage could be lowered in keeping with the thickness of the dielectric layer 103. In other words, in Test products 2 to 4, it was possible to move the droplets at very low application voltages of 14 V, 5 V and 4V.

SECOND EXAMPLE

Now, the second example was conducted to verify an increase in the moving speed of the conductive liquid 21 due to the nonpolar oil 22 described above.

Figure 9A:
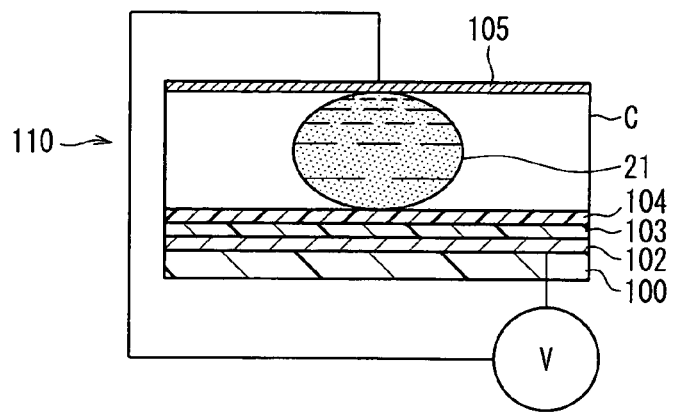
FIGS. 9A and 9B are drawings for describing a display device in a second example of the present invention.
Figure 9B:
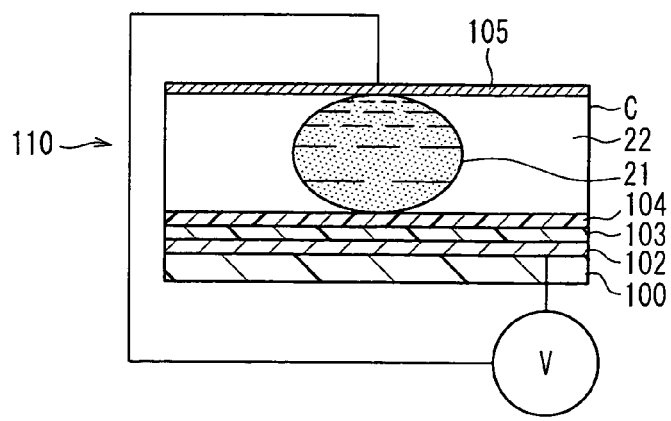
Figure 10:
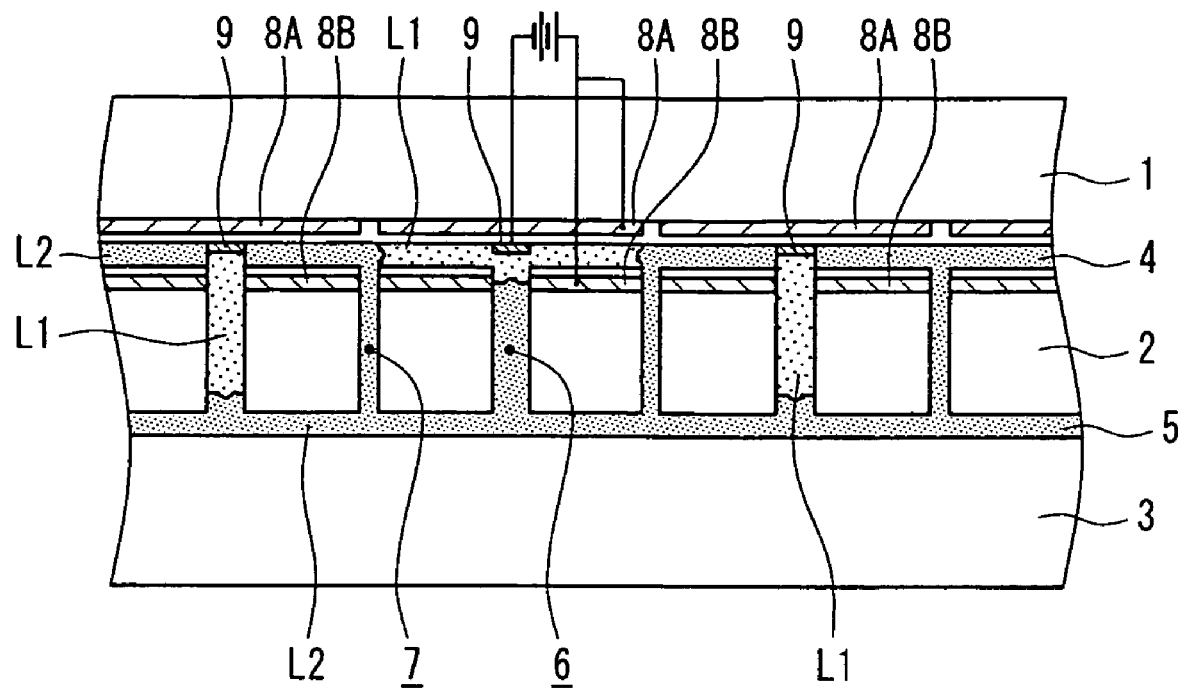
FIG. 10 is a sectional view showing a configuration of a main portion of a display device and an image display according to a conventional example.

In this second example, Test products 5 and 6 respectively shown in FIGS. 9A and 9B were prepared so as to verify the effect of the nonpolar oil 22. More specifically, Test product 5 was identical with Test product 1 in the first example described above and was able to move the droplet when the application voltage from the alternating-current power supply V was set to 40 V, similarly to the case of Test product 1. In Test product 6, in addition to the conductive liquid 21 using the same ionic liquid as that in Test product 5, n-dodecane (manufactured by Kishida Chemical Co., Ltd.) as the nonpolar oil 22 was sealed into the case C. Then, similarly to Test product 5, the application voltage from the alternating-current power supply V was raised in increments of 1 V from 1 V to 100 V at 10 kHz. As a result, it was confirmed that the droplet moved at the application voltage of 20 V in Test product 6. In other words, it was verified that the droplet could be moved at a lower application voltage in the case of using the nonpolar oil 22 than in the case of using the air as the insulating fluid.

Further, the ionic conductivity of the conductive liquid 21 in Test products 1 to 6 described above was measured by a complex impedance method using an SUS electrode with an impedance analyzer HP4294A manufactured by TOYO Corporation. The results showed that, in all of Test products 1 to 6, the ionic conductivity (S/cm) at 25° C. was equal to or greater than $0.1 \times 10^{-3}$. In the case of using the conductive liquid 21 having a high ionic conductivity of equal to or greater than $0.1 \times 10^{-3}$ as above, an electric charge was stored in the dielectric layer and the surface of the droplet more easily, making it possible to improve an electric charge density. As a result, the electric charges repel each other more easily, making it easier to change the shape of the droplet.

Consequently, it was confirmed that it was possible to move the droplet, in other words, drive the display device at a low voltage.

Incidentally, according to the experiment conducted by the inventors of the present invention, in the case where the ionic conductivity was smaller than $0.1 \times 10^{-3}$, it was not possible to move the droplet at a low application voltage unlike the experimental results of Test products 1 to 6 in the first and second examples described above.

It should be noted that the above-described embodiments are all illustrative and not limiting. The technical scope of the present invention is defined by the claims, and all changes within the range equivalent to the configurations recited therein also are included in the technical scope of the present invention.

For example, although the above description has been directed to the case of applying the present invention to an image display including a display portion that can display a color image, the present invention can be used in any electric apparatuses provided with a display portion for displaying information containing a character and an image without any particular limitation. The present invention can be used in a preferred manner in various electric apparatuses including a display portion, for example, personal digital assistants (PDAs) such as electronic personal organizers, displays attached to personal computers and TV sets, and electronic papers.

Further, in the above description, the liquid colored in a predetermined color has been used. However, the liquid according to the present invention may be any liquid prepared by using the above-described ionic liquid containing an ambient temperature molten salt combining cation and anion and blending 0 to 10 parts by weight of water with respect to 100 parts by weight of this ionic liquid. For example, it also may be possible to use a transparent liquid without adding a colorant.

Moreover, alternatively to the above description, by adding light-scattering particles to the ionic liquid or the nonpolar oil, the ionic liquid or the nonpolar oil may be made into light-scattering fluids so as to display white. In this case, it becomes possible to omit the light-scattering layer described above.

Although the above description has been directed to the case of constituting a display device of an electrowetting system in which the liquid was moved according to the application of an electric field to this liquid, the display device of the present invention is not limited to this as long as it is a display device of an electric field induction type in which an external electric field is utilized to operate a liquid sealed so as to be flowable into or out of a display space or able to increase or decrease its surface area inside the display space, thereby making it possible to change a display color on the display surface side. The present invention is applicable to electric-field-induction-type display devices of other systems such as an electroosmosis system, an electrophoresis system, a dielectrophoresis system and the like.

However, the case of including a transparent upper layer provided on the display surface side and a light-scattering layer provided such that the display space is formed between the upper layer and the light-scattering layer and selectively changing the display color on the display surface side between a predetermined color resulting from a colored liquid and white resulting from the light-scattering layer is more preferable because the structure of the display device can be simplified and further because the quality of white display can be improved easily by displaying white resulting from the light-scattering layer.

Also, although the above description has been directed to the case of constituting the display surface including display spaces for individual colors of R, G and B, the present invention is not limited to this as long as a plurality of display spaces are provided respectively for a plurality of colors allowing a full color display on the display surface side. More specifically, display spaces in which colored liquids colored respectively in cyan (C), magenta (M) and yellow (Y) are sealed are provided instead of the display spaces for R, G and B described above, thus constituting the display spaces for individual colors of C, M and Y. However, in the case of constituting the display spaces for C, M and Y, it is more preferable to provide a display space for black having a colored liquid colored in black because the display quality of black display may deteriorate compared with the case of R, G and B. Furthermore, it also is possible to use colored liquids colored in predetermined colors corresponding to combinations of a plurality of colors that can display a color image on the display surface other than R, G, B and C, M, Y, for example, R, G, B, Y, C (five colors), R, G, B, C (four colors), R, G, B, Y (four colors), G, M (two colors), etc.

In addition, although the above description has been directed to the case of using the alternating-current power supply, the alternating-current power supply can be replaced with a direct-current power supply.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A display device comprising:
   a display space provided on a display surface side; and
   a liquid and an insulating fluid that does not mix with the liquid sealed inside the display space so as to be operable, said liquid being colored in a predetermined color;
   the display device being constituted so as to be able to change a display color on the display surface side according to an application of an electric field to the liquid; a transparent upper layer provided on the display surface side and a light-scattering layer provided such that the display space is formed between the upper layer and the light-scattering layer are provided, and the display color on the display surface side is changed selectively between the predetermined color resulting from the liquid and white resulting from the light-scattering layer;
   wherein the liquid is an ionic liquid containing an ambient temperature molten salt combining a cation and an anion, and
   an amount of water blended in the liquid is 0 to 10 parts by weight with respect to 100 parts by weight of the ionic liquid.

2. The display device according to claim 1, comprising a lower layer provided on a non-display surface side of the light-scattering layer,
   wherein an upper space constituting the display space is formed between the upper layer and the light-scattering layer, and a lower space that is in communication with the upper space via a communication space provided so as to penetrate through the light-scattering layer is provided between the light-scattering layer and the lower layer, and the display device comprises
- a transparent upper electrode provided on a surface side opposed to the upper space in at least one of the upper layer and the light-scattering layer,
- a common electrode provided in the light-scattering layer so as to surround the communication space,
- a lower electrode provided on a surface side opposed to the lower space in at least one of the light-scattering layer and the lower layer, and
- a driving portion that comprises an upper switch connected between the upper electrode and the common electrode, a lower switch connected between the lower electrode and the common electrode and a power supply and changes the display color on the display surface side by moving the liquid toward the upper space or the lower space according to an operation of opening/closing the upper switch and the lower switch.

3. The display device according to claim 2, wherein a dielectric layer is layered on surfaces of the upper electrode and the lower electrode.

4. The display device according to claim 1, wherein the light-scattering layer is provided with a liquid storage space whose one end is in communication with the display space, and the display device comprises
- a transparent first electrode provided on a surface side opposed to the display space in at least one of the upper layer and the light-scattering layer,
- a second electrode provided in the light-scattering layer so as to surround the liquid storage space, and
- a driving portion that has a switch and a power supply connected between the first electrode and the second electrode and changes the display color on the display surface side by moving the liquid toward the display space or the liquid storage space according to an operation of closing/opening the switch.

5. The display device according to claim 4, wherein a dielectric layer is layered on a surface of the first electrode or the second electrode.

6. The display device according to claim 1, wherein the liquid is an ionic liquid that is a nonaqueous solution containing no water.

7. The display device according to claim 1, wherein an electrolyte of the ionic liquid is formed of a 1-1 salt obtained by combining one kind of the cation that is monovalent and one kind of the anion that is monovalent.

8. The display device according to claim 1, wherein the cation is selected from the group consisting of 1,3-dialkylimidazolium cation, N-alkylpyridinium cation, tetraalkylammonium cation and tetraalkylphosphonium cation.

9. The display device according to claim 1, wherein the anion is selected from the group consisting of $(AlCl_3)nCl^-$, $(AlBr_3)nBr^-$, $Cl^-$, $Br^-$, $I^-$, $(HF)nF^-$, $(HF)_2F_3^-$, $BF_4^-$, $AlF_4^-$, $PF_6^-$, $AsF_6^-$, $SbF_6^-$, $NbF_6^-$ $TaF_6^-$, $CH_3SO_3^-$, $WF_7^-$, $NO_3^-$, $NO_2^-$, $VOCl_4^-$, $CF_3SO_3^-$, $(CF_3SO_2)_2N^-$, $(CF_3SO_2)_3C^-$, $C_4H_9SO_3^-$, $(CF_3CF_2SO_2)N^-$, $CF_3CO_2^-$, $CF_3CF_2CO^-$, $CF_3CF_2CF_2SO_3^-$, $(CN)_2N^-$ and $CH_3CO_2^-$, where n is an integer.

10. The display device according to claim 1, wherein the ionic liquid contains a chemical species selected from the group consisting of chemical compounds represented by the structural formulae below:

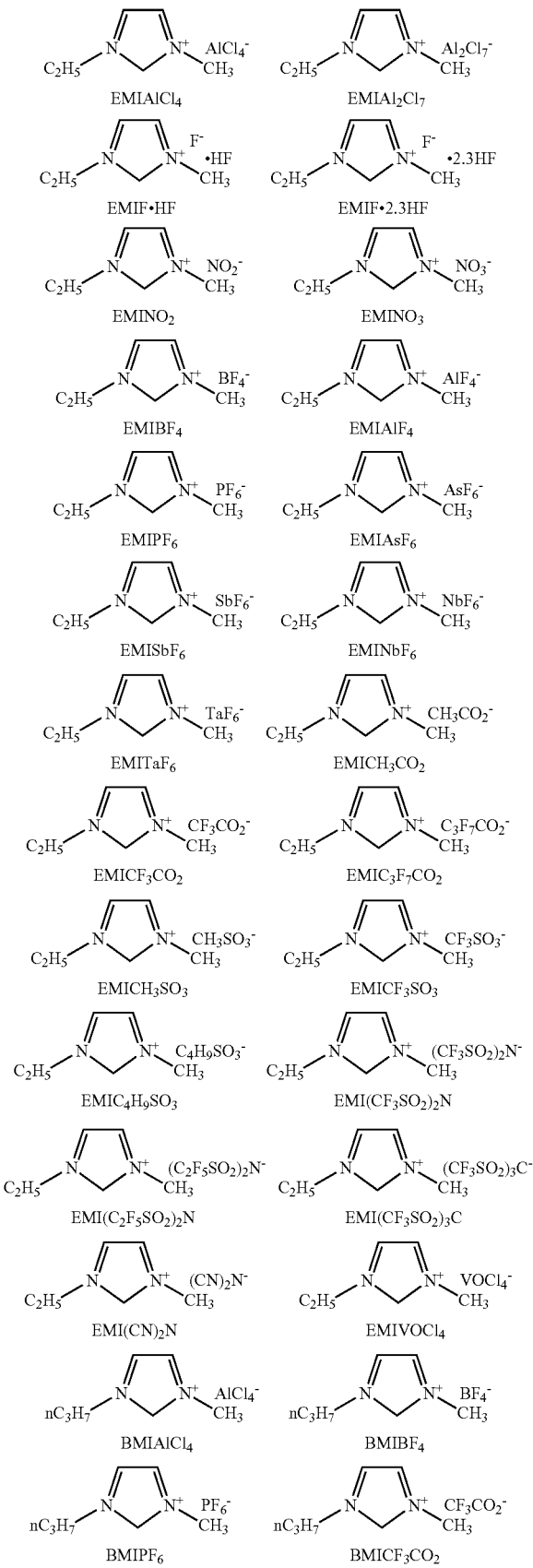

-continued

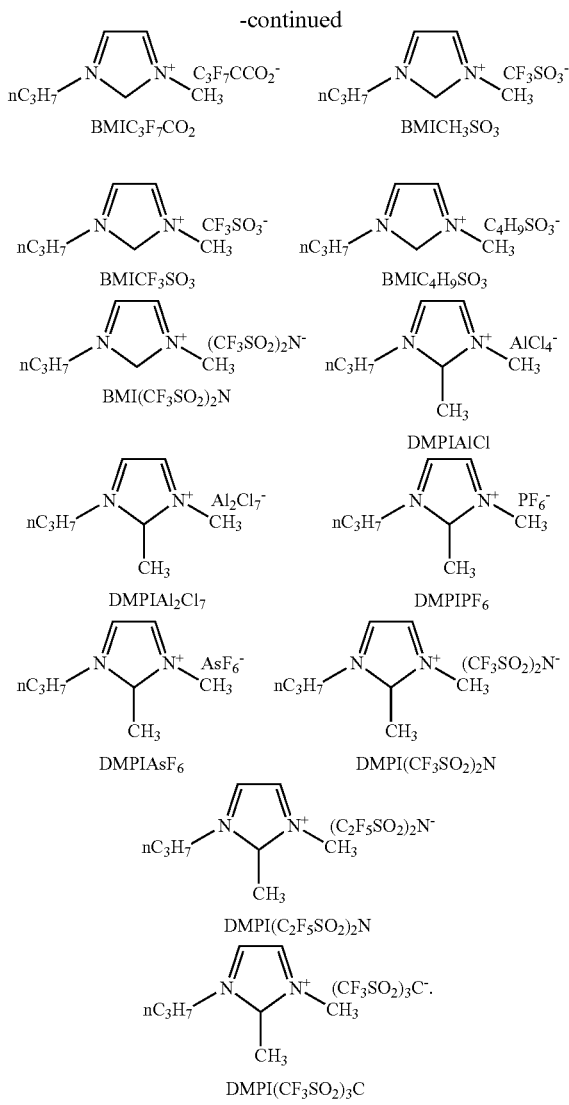

11. The display device according to claim 1, wherein the ionic liquid has an ionic conductivity (s/cm) at 25° C. of equal to or greater than $0.1\times10^{-3}$.

12. The display device according to claim 1, wherein the ionic liquid has a viscosity at 25° C. of equal to or smaller than 300 cp.

13. The display device according to claim 1, wherein the ionic liquid has a melting point ranging from −4° C. to −90° C.

14. The display device according to claim 1, wherein a plurality of the display spaces are provided respectively for a plurality of colors allowing a full color display on the display surface side.

15. An electric apparatus comprising:
a display portion for displaying information containing a character and an image;
wherein the display portion is a display device that comprises a display space provided on a display surface side and a liquid sealed inside the display space so as to be operable and is constituted so as to be able to change a display color on the display surface side according to an application of an electric field to the liquid, wherein an insulating fluid that does not mix with the liquid is sealed inside the display space, said liquid being colored in a predetermined color, a transparent upper layer provided on the display surface side and a light-scattering layer provided such that the display space is formed between the upper layer and the light-scattering layer are provided, and the display color on the display surface side is changed selectively between the predetermined color resulting from the liquid and white resulting from the light-scattering layer;
the liquid is an ionic liquid containing an ambient temperature molten salt combining a cation and an anion, and
an amount of water blended in the liquid is 0 to 10 parts by weight with respect to 100 parts by weight of the ionic liquid.

* * * * *